(12) United States Patent
Hingtgen et al.

(10) Patent No.: US 11,659,065 B2
(45) Date of Patent: May 23, 2023

(54) QUALITY OF SERVICE CONTROL IN CONTENT DELIVERY SYSTEM

(71) Applicant: Comcast Cable Communications, LLC, Philadelphia, PA (US)

(72) Inventors: Stephanie Hingtgen, Westminster, CO (US); David Arbuckle, Denver, CO (US)

(73) Assignee: Comcast Cable Communications, LLC, Philadelphia, PA (US)

( * ) Notice: Subject to any disclaimer, the term of this patent is extended or adjusted under 35 U.S.C. 154(b) by 0 days.

(21) Appl. No.: 16/846,470

(22) Filed: Apr. 13, 2020

(65) Prior Publication Data

US 2021/0320985 A1   Oct. 14, 2021

(51) Int. Cl.
*H04L 67/61* (2022.01)
*H04L 67/63* (2022.01)
*H04L 41/5003* (2022.01)
*H04L 67/568* (2022.01)

(52) U.S. Cl.
CPC .......... *H04L 67/63* (2022.05); *H04L 41/5003* (2013.01); *H04L 67/568* (2022.05); *H04L 67/61* (2022.05)

(58) Field of Classification Search
CPC . H04L 41/0893; H04L 45/42; H04L 65/1066; H04L 67/1095; H04L 67/63; H04L 67/61; H04L 67/568; H04L 41/5003
See application file for complete search history.

(56) References Cited

U.S. PATENT DOCUMENTS

| | | | |
|---|---|---|---|
| 9,351,193 B2 * | 5/2016 | Raleigh | G06Q 40/00 |
| 2015/0156082 A1 * | 6/2015 | Kakadia | H04L 47/50 709/223 |
| 2015/0189540 A1 | 7/2015 | Jung et al. | |
| 2017/0264711 A1 | 9/2017 | Natarajan et al. | |

FOREIGN PATENT DOCUMENTS

WO   WO-2019120504 A1 *  6/2019   ............ H04L 41/06

* cited by examiner

*Primary Examiner* — Ryan J Jakovac
(74) *Attorney, Agent, or Firm* — Banner & Witcoff, Ltd.

(57) ABSTRACT

Systems, apparatuses, and methods are described for controlling quality of service (QoS) provided to user devices by, for example, requesting a portion of the user devices to temporarily and selectively downgrade a quality of service. A downgrade message may be sent to the user devices to request a downgrade, and may provide information to allow the user devices to determine whether they will abide by the requested downgrade.

40 Claims, 12 Drawing Sheets

US 11,659,065 B2

QUALITY OF SERVICE CONTROL IN CONTENT DELIVERY SYSTEM

BACKGROUND

In a content delivery system, a plurality of user devices may make requests to a network component (e.g., an origin server, a cache, a network router, or etc.) for segments of a content item, such as a movie. The segments of the content item may comprise small portions of the content item, such as 2 seconds of audio and video, and over the course of a movie, a user device may send hundreds of requests for the various segments of the movie. If a user device requests a segment, and does not receive a response within a certain amount of time, the user device may retry the request (e.g., send another request for the segment). If the network component, such as a cache, has become overloaded, then these retries may worsen the overload situation and make it even more difficult for these user devices to download the content, and may eventually cause a system wide outage.

SUMMARY

The following summary presents a simplified summary of certain features. The summary is not an extensive overview and is not intended to identify key or critical elements.

Systems, apparatuses, and methods are described for handling overload situations in a content delivery system. If a particular network element has become overloaded, then a message may be sent to the various user devices that are serviced by that network element. The message may provide information to allow the user devices to voluntarily decide whether to downgrade the demands they are placing on the network element. For example, the message may request that a certain quantity (e.g., a certain percentage) of all of the user devices downgrade the quality of the video that they are requesting, such as changing from requesting 1080p resolution video segments to requesting 720p resolution video segments. Sending such a message may efficiently inform the user devices of the overload situation, so that they may reduce their retries. The message may be placed within a requested video segment, to further simplify the system, and messages may be repeated and/or adjusted over time depending on varying levels of overloading and user device responses to prior messages.

These and other features and advantages are described in greater detail below.

BRIEF DESCRIPTION OF THE DRAWINGS

Some features are shown by way of example, and not by limitation, in the accompanying drawings. In the drawings, like numerals reference similar elements.

DETAILED DESCRIPTION

Figure 1:
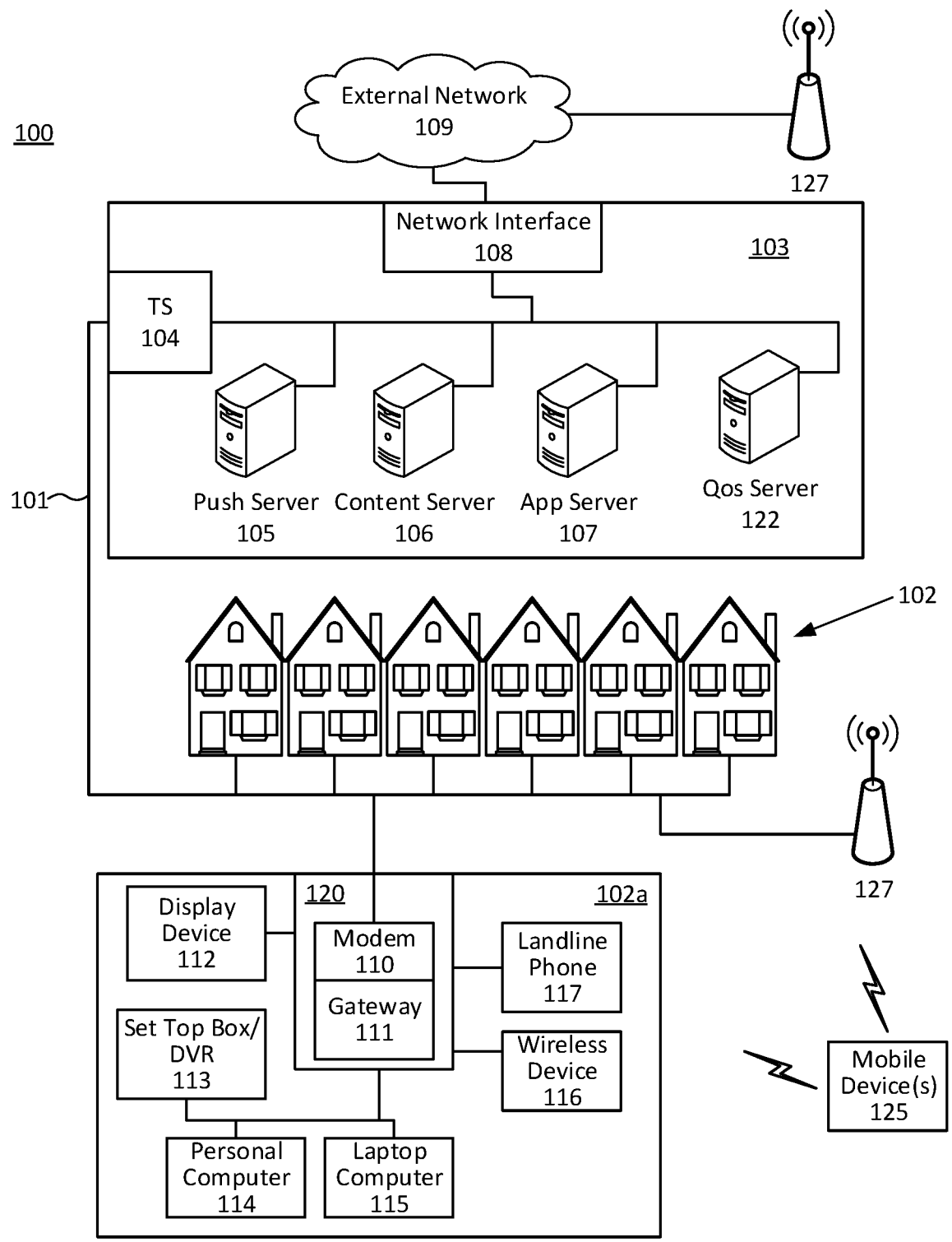
FIG. 1 shows an example communication network.

The accompanying drawings, which form a part hereof, show examples of the disclosure.

It is to be understood that the examples shown in the drawings and/or discussed herein are non-exclusive and that there are other examples of how the disclosure may be practiced.

FIG. 1 shows an example communication network 100 (e.g., the system) in which features described herein may be implemented. The communication network 100 may comprise one or more information distribution networks of any type, such as, without limitation, a telephone network, a wireless network (e.g., an LTE network, a 5G network, a WiFi IEEE 802.11 network, a WiMAX network, a satellite network, and/or any other network for wireless communication), an optical fiber network, a coaxial cable network, and/or a hybrid fiber/coax distribution network. The communication network 100 may use a series of interconnected communication links 101 (e.g., coaxial cables, optical fibers, wireless links, etc.) to connect multiple premises 102 (e.g., businesses, homes, consumer dwellings, train stations, airports, etc.) to a local office 103 (e.g., a headend). The local office 103 may send downstream information signals and receive upstream information signals via the communication links 101. Each of the premises 102 may comprise devices, described below, to receive, send, and/or otherwise process those signals and information contained therein.

The communication links 101 may originate from the local office 103 and may comprise components not illustrated, such as splitters, filters, amplifiers, etc., to help convey signals clearly. The communication links 101 may be coupled to one or more wireless access points 127 configured to communicate with one or more mobile devices 125 via one or more wireless networks. The mobile devices 125 may comprise smart phones, tablets or laptop computers with wireless transceivers, tablets or laptop computers communicatively coupled to other devices with wireless transceivers, and/or any other type of device configured to communicate via a wireless network.

The local office 103 may comprise an interface 104, such as a termination system (TS). The interface 104 may be any computing device configured to send information downstream to, and/or to receive information upstream from, devices communicating with the local office 103 via the communications links 101. For example, the interface 104 may comprise a computing device such as a cable modem termination system (CMTS), fiber optic interface server, etc. The interface 104 may be configured manage communications among those devices, to manage communications between those devices and backend devices such as servers 105-107 and 122, and/or to manage communications between those devices and one or more external networks 109. The local office 103 may comprise one or more network interfaces 108 that comprise circuitry needed to communicate via the external networks 109. The external networks 109 may comprise networks of Internet devices, telephone networks, wireless networks, fiber optic networks, and/or any other desired network. The local office 103 may also or alternatively communicate with the mobile devices 125 via the interface 108 and one or more of the external networks 109, e.g., via one or more of the wireless access points 127.

The push notification server 105 may be configured to generate push notifications to deliver information to devices in the premises 102 and/or to the mobile devices 125. The content server 106 may be configured to provide content to devices in the premises 102 and/or to the mobile devices 125. This content may comprise, for example, video, audio, text, web pages, images, files, etc. The content server 106 (or, alternatively, an authentication server) may comprise software to validate user identities and entitlements, to locate and retrieve requested content, and/or to initiate delivery (e.g., streaming) of the content. The content server 106 may comprise one or more of the origin servers or caches. Video content may be information displayed (or displayable) to a user in the form of one or more images. Video content can be communicated or stored in the form of data. Video content data providing a digital representation of a particular video content can be created using any of various encoding techniques. Such encoding techniques include, but are not limited to, compression according to a Motion Picture Experts Group (MPEG) standard (e.g., MPEG-2), compression according to the ITU-T H.264 (ISO/IEC MPEG-4) advanced video coding (AVC) standard, etc.

In adaptive bitrate streaming (ABS), a video may be encoded using, for example, either MPEG-2 or AVC. The video may be divided into multiple content segments, e.g., video data chunks each having, for example, a few seconds duration. Each content segment (or segment) may be encoded at different qualities (e.g., pixel resolution, bitrate, frame rate or frame size, color depth, sound channels, and any other types of quality) such that different quality levels of each segment may be available for user devices to download. After the user device requests video content (e.g., a video program, a video service, etc.), the system may send a manifest file of the video content to the user device. The user device may save the manifest file in a local or remote storage. The manifest file may list segment identifications, access addresses of different quality versions of segments, and/or other parameters of the segments. The user device may retrieve content segments based on the corresponding access addresses. In some cases, the system may send the user device an updated manifest file if all the segments indicated on the current manifest file have been retrieved by the user device.

The application server 107 may be configured to offer any desired service. For example, an application server may be responsible for collecting, and generating a download of, information for electronic program guide listings. Another application server may be responsible for monitoring user viewing habits and collecting information from that monitoring for use in selecting advertisements. Yet another application server may be responsible for formatting and inserting advertisements in a video stream being transmitted to devices in the premises 102 and/or to the mobile devices 125. The local office 103 may comprise additional servers, such as the QoS server 122 (e.g., the QoS controller) which is described below, additional push, content, and/or application servers, and/or other types of servers. For example, the QoS server 122 may detect an overload at the content server 106 (or at any other network components, e.g., the interface 104). To bring the content server 106 back to a normal operation range (or a normally loaded range which will be discussed with respect to FIG. 4), the QoS server 122 may instruct the content server 106 to downgrade a sub set of the user devices to lower QoS. Based on downgrade instructions, the content server 106 may insert one or more downgrade messages in the content that is sent the user devices. The downgrade messages may be QoS downgrade headers included in the content sent to the user devices. The user devices may determine, based on the QoS downgrade headers and/or the user profile, whether to downgrade to low QoS. The downgraded user devices may request a lower quality version for future content. Although shown separately, the push server 105, the content server 106, the application server 107, the QoS server 122, and/or other server(s) may be combined. The servers 105, 106, 107, and 122, and/or other servers, may be computing devices and may comprise memory storing data and also storing computer executable instructions that, when executed by one or more processors, cause the server(s) to perform steps described herein.

An example premises 102a may comprise an interface 120. The interface 120 may comprise circuitry used to communicate via the communication links 101. The interface 120 may comprise a modem 110, which may comprise transmitters and receivers used to communicate via the communication links 101 with the local office 103. The modem 110 may comprise, for example, a coaxial cable modem (for coaxial cable lines of the communication links 101), a fiber interface node (for fiber optic lines of the communication links 101), twisted-pair telephone modem, a wireless transceiver, and/or any other desired modem device. One modem is shown in FIG. 1, but a plurality of modems operating in parallel may be implemented within the interface 120. The interface 120 may comprise a gateway 111. The modem 110 may be connected to, or be a part of, the gateway 111. The gateway 111 may be a computing device that communicates with the modem(s) 110 to allow one or more other devices in the premises 102a to communicate with the local office 103 and/or with other devices beyond the local office 103 (e.g., via the local office 103 and the external network(s) 109). The gateway 111 may comprise a set-top box (STB), digital video recorder (DVR), a digital transport adapter (DTA), a computer server, and/or any other desired computing device.

The gateway 111 may also comprise one or more local network interfaces to communicate, via one or more local networks, with devices in the premises 102a. Such devices (e.g., user devices) may comprise, e.g., display devices 112 (e.g., televisions), STBs or DVRs 113, personal computers 114, laptop computers 115, wireless devices 116 (e.g., wireless routers, wireless laptops, notebooks, tablets and netbooks, cordless phones (e.g., Digital Enhanced Cordless Telephone-DECT phones), mobile phones, mobile televisions, personal digital assistants (PDA)), landline phones 117 (e.g. Voice over Internet Protocol-VoIP phones), and any other desired devices. Example types of local networks comprise Multimedia Over Coax Alliance (MoCA) networks, Ethernet networks, networks communicating via Universal Serial Bus (USB) interfaces, wireless networks (e.g., IEEE 802.11, IEEE 802.15, Bluetooth), networks communicating via in-premises power lines, and others. The lines connecting the interface 120 with the other devices in the premises 102a may represent wired or wireless connections, as may be appropriate for the type of local network used. One or more of the devices at the premises 102a may be configured to provide wireless communications channels (e.g., IEEE 802.11 channels) to communicate with one or more of the mobile devices 125, which may be on- or off-premises.

The mobile devices 125, one or more of the devices in the premises 102a, and/or other devices may receive, store, output, and/or otherwise use assets. An asset may comprise a video, a game, one or more images, software, audio, text, webpage(s), and/or other content.

Figure 2:
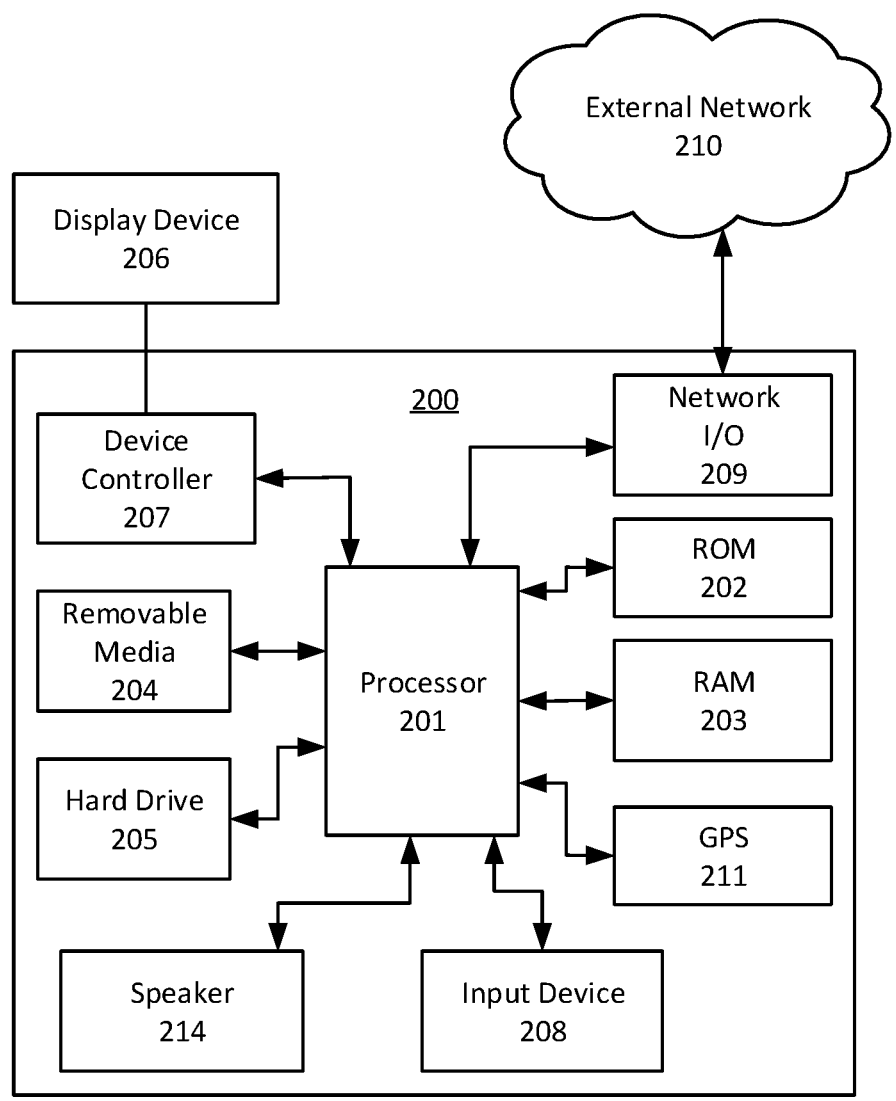
FIG. 2 shows hardware and software elements of a computing device.

FIG. 2 shows hardware and software elements of a computing device 200 that may be used to implement any of the computing devices shown in FIG. 1 (e.g., the mobile devices 125, any of the devices shown in the premises 102a, any of the devices shown in the local office 103, any of the wireless access points 127, any devices with the external network 109) and any other computing devices discussed herein (e.g., a random number generator that may generate a random number). The computing device 200 may comprise one or more processors 201, which may execute instructions of a computer program to perform any of the functions described herein. The instructions may be stored in a read-only memory (ROM) 202, random access memory (RAM) 203, removable media 204 (e.g., a USB drive, a compact disk (CD), a digital versatile disk (DVD)), and/or in any other type of computer-readable medium or memory. Instructions may also be stored in an attached (or internal) hard drive 205 or other types of storage media. The computing device 200 may comprise one or more output devices, such as a display device 206 (e.g., an external television and/or other external or internal display device) and a speaker 214, and may comprise one or more output device controllers 207, such as a video processor. One or more user input devices 208 may comprise a remote control, a keyboard, a mouse, a touch screen (which may be integrated with the display device 206), microphone, etc. The computing device 200 may also comprise one or more network interfaces, such as a network input/output (I/O) interface 210 (e.g., a network card) to communicate with an external network 209. The network I/O interface 210 may be a wired interface (e.g., electrical, RF (via coax), optical (via fiber)), a wireless interface, or a combination of the two. The network I/O interface 210 may comprise a modem configured to communicate via the external network 209. The external network 209 may comprise the communication links 101 discussed above, the external network 109, an in-home network, a network provider's wireless, coaxial, fiber, or hybrid fiber/coaxial distribution system (e.g., a DOCSIS network), or any other desired network. The communication device 200 may comprise a location-detecting device, such as a global positioning system (GPS) microprocessor 211, which may be configured to receive and process global positioning signals and determine, with possible assistance from an external server and antenna, a geographic position of the communication device 200.

Although FIG. 2 shows an example hardware configuration, one or more of the elements of the computing device 200 may be implemented as software or a combination of hardware and software. Modifications may be made to add, remove, combine, divide, etc. components of the computing device 200. Additionally, the elements shown in FIG. 2 may be implemented using basic computing devices and components that have been configured to perform operations such as are described herein. For example, a memory of the computing device 200 may store computer-executable instructions that, when executed by the processor 201 and/or one or more other processors of the computing device 200, cause the computing device 200 to perform one, some, or all of the operations described herein. Such memory and processor(s) may also or alternatively be implemented through one or more Integrated Circuits (ICs). An IC may be, for example, a microprocessor that accesses programming instructions or other data stored in a ROM and/or hardwired into the IC. For example, an IC may comprise an Application Specific Integrated Circuit (ASIC) having gates and/or other logic dedicated to the calculations and other operations described herein. An IC may perform some operations based on execution of programming instructions read from ROM or RAM, with other operations hardwired into gates or other logic. Further, an IC may be configured to output image data to a display buffer.

As mentioned previously, if too many user devices request content at a same time, the system may become overloaded and may be unable to fulfill some of the content requests. Some of the user devices may fail to download content they requested. The user devices may be unaware of the system overload, and may repeatedly retry to download the content. These aggressive retries may worsen the system overload and may eventually cause a system outage. To reduce the possibility of such a system outage and resolve the system overload, the system may temporarily downgrade one or more of the user devices to lower QoS. After the system overload is resolved, the system may stop downgrading the user devices, and they may resume requesting their original higher quality content. These features will be further described with reference to FIGS. 3A-9, described below.

Figure 3A:
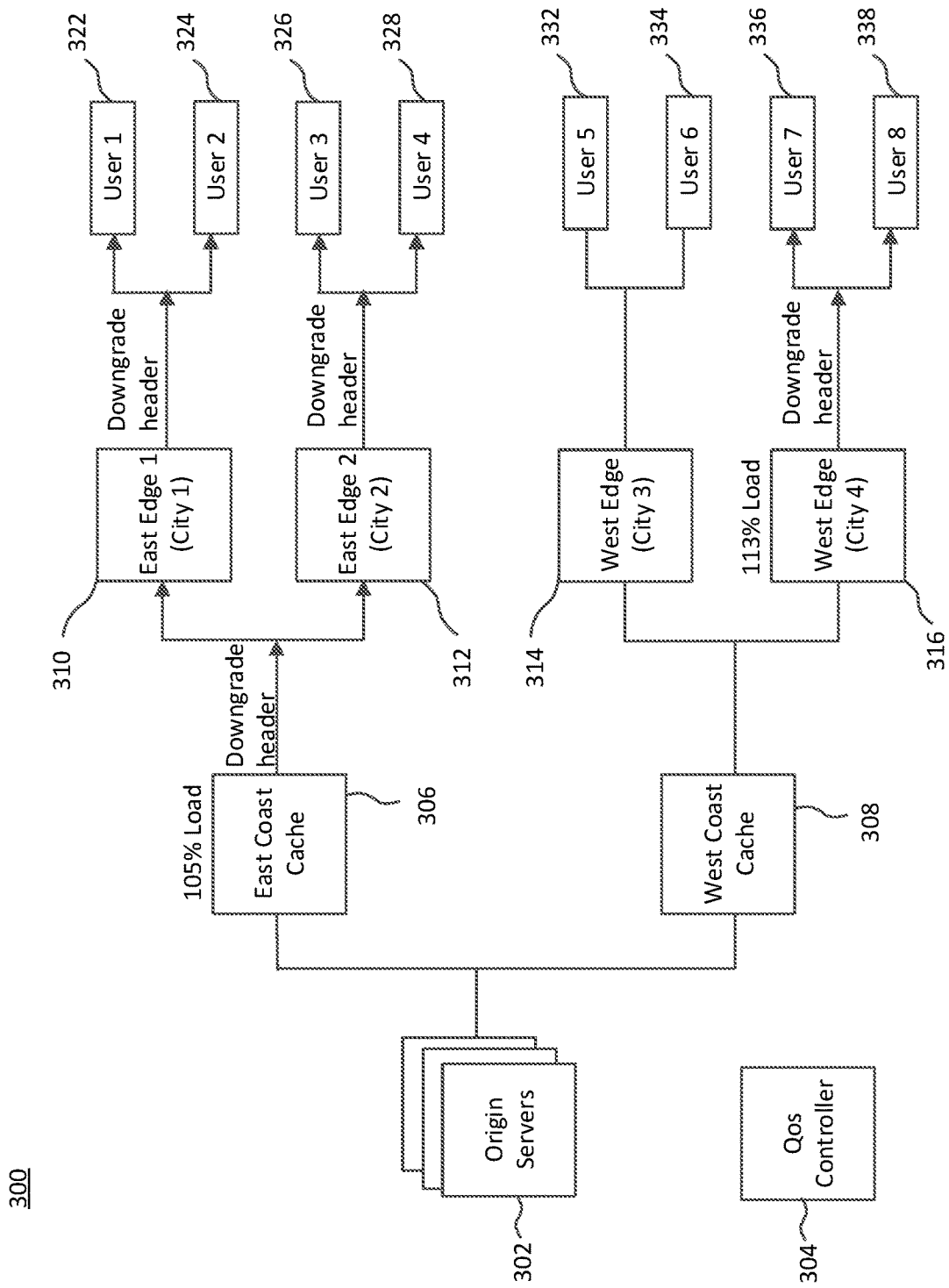
FIGS. 3A-3D show examples of a content delivery system under various load conditions.
Figure 3B:
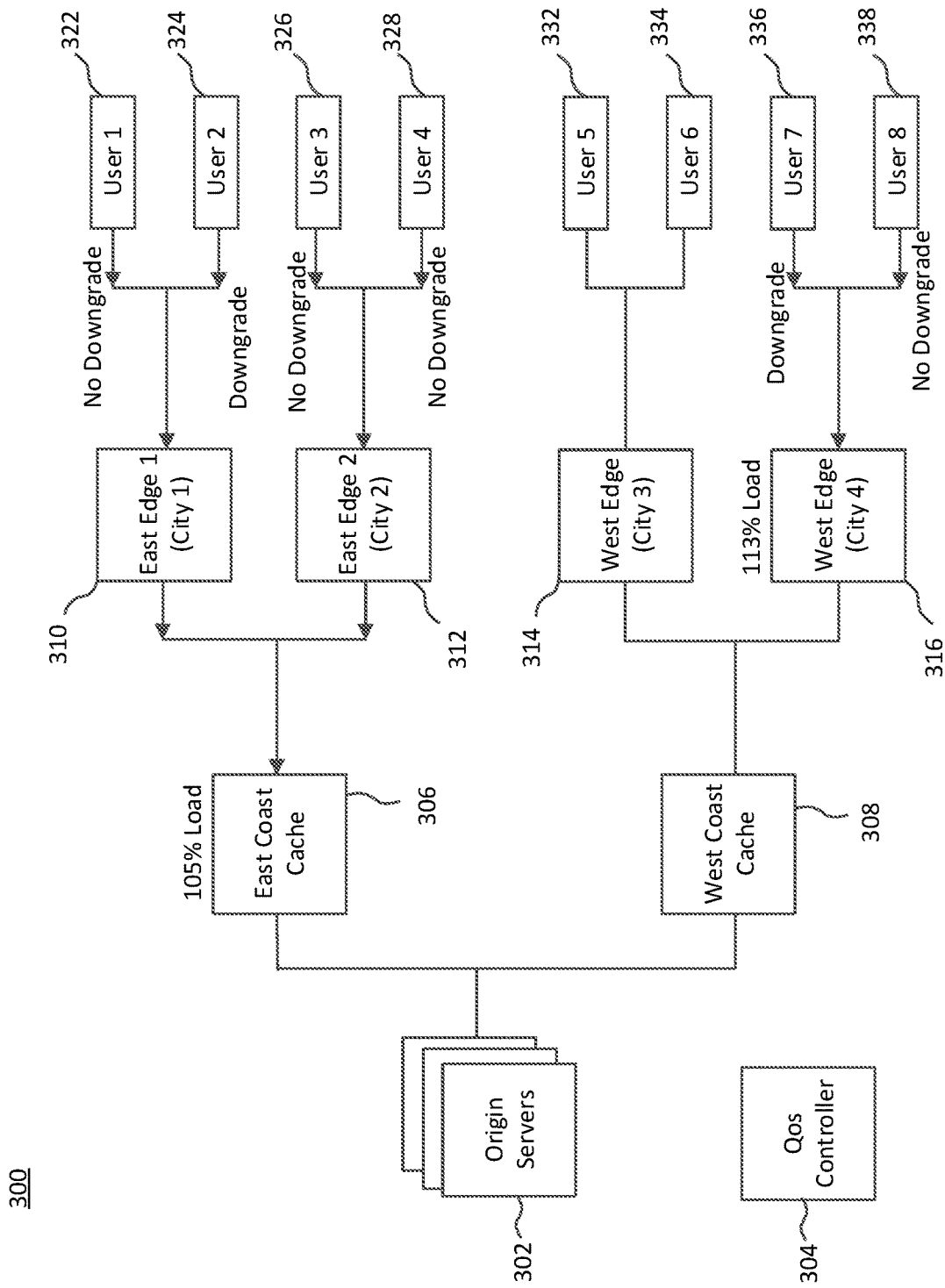
Figure 3C:
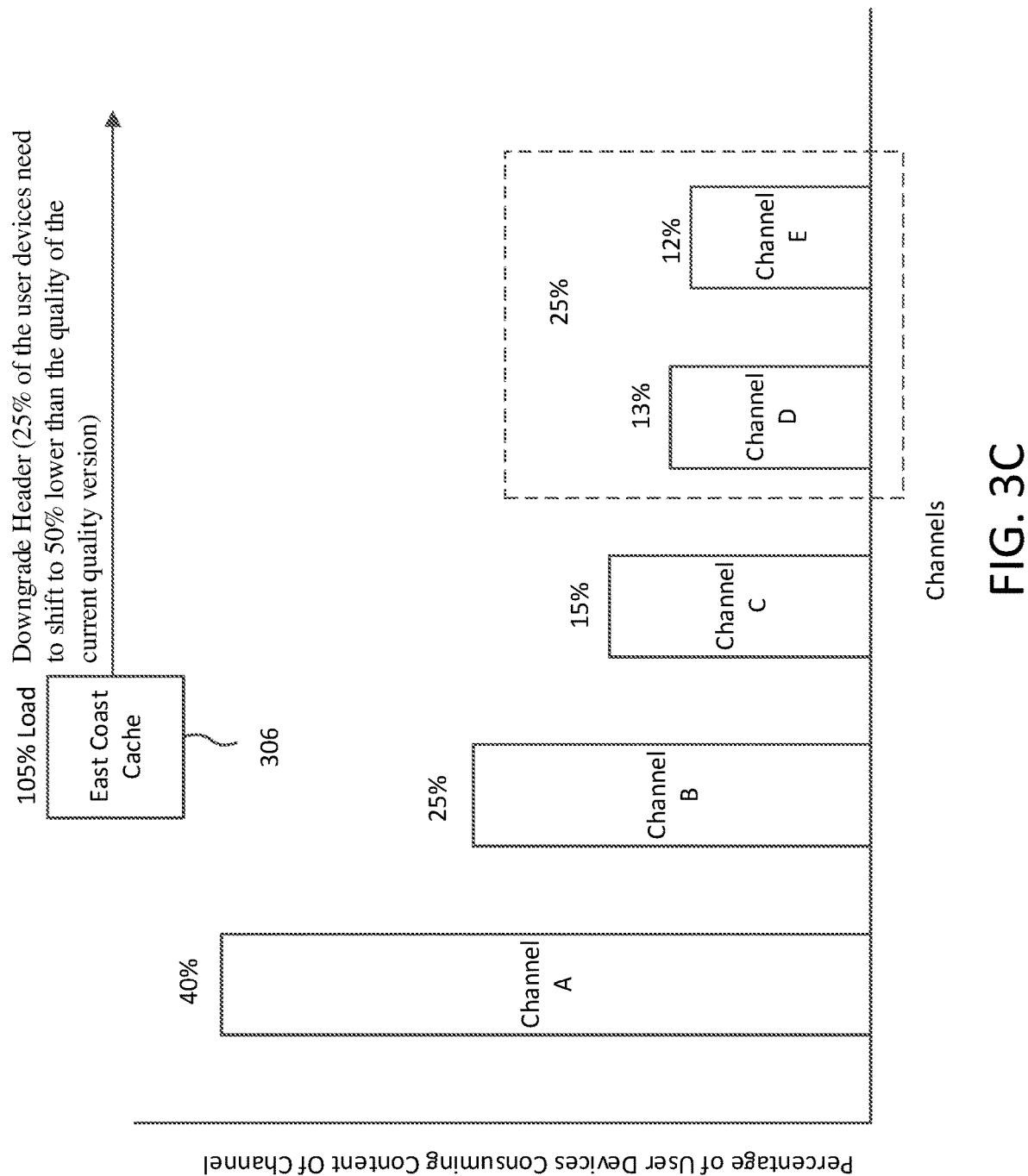
Figure 3D:
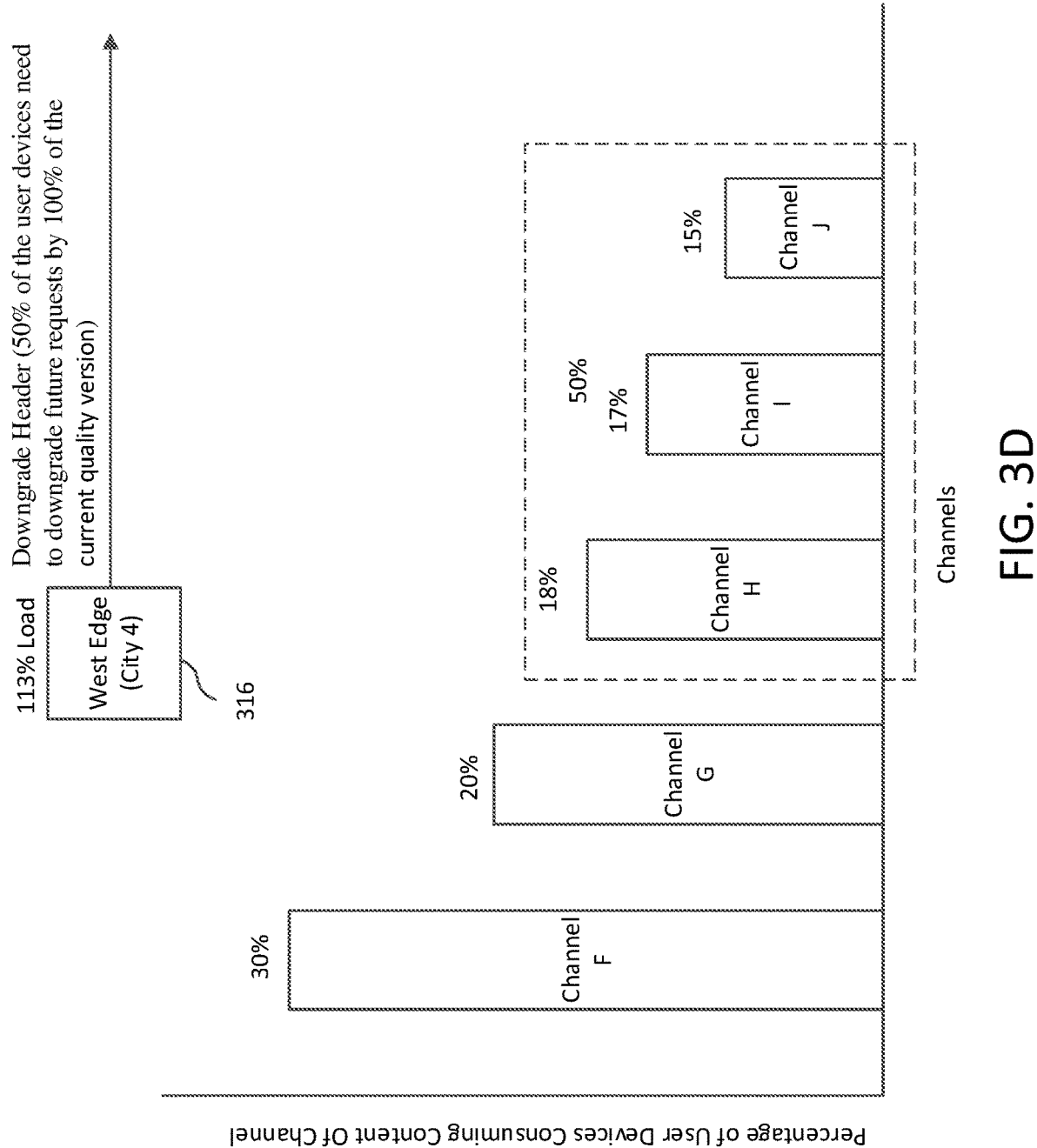

FIGS. 3A-3D show examples of a content delivery system (hereafter, system 300) under various load conditions. In these examples, the system may send downgrade message(s) to the user devices to relieve the system overload (FIG. 3A), and the user devices may respond to the downgrade message(s) by either downgrading or excluding themselves from being downgraded (FIG. 3B); and an overloaded network component may determine to downgrade some of video services, among all the video services that are provided to user devices associated with the overloaded network component, to alleviate an overload situation (FIG. 3C and FIG. 3D).

The system 300 may provide content (e.g., video content) to user devices 322-338. For example, each of the user devices 322-338 may comprise any one of display devices 112, STBs or DVRs 113, personal computers 114, laptop computers 115, wireless devices 116, landline phones 117, and any other desired devices show in FIG. 1. The system 300 may comprise a hierarchy of caches 306-316 disposed between one or more origin servers 302 and the user devices 322-338. Each of the one or more origin servers 302 may store certain content. For example, one origin server 302 may be a data center storing content, such as one or more video programs (movies, serial episodes, webcasts, etc.), audio programs (e.g., podcasts, musical recordings, etc.), or any other desired type of data. Another origin server 302 may be a data center storing content of a video service (e.g., Home Box Office (HBO)). Still another origin server 302 may be a data center storing content of another video service (e.g., American Broadcasting Company (ABC)). The origin servers 302 may store any content that is not limited to the content described above. Each of the origin servers 302 and caches 306-316 may comprise the content server 106 as shown in FIG. 1.

The caches 306-316 may be used to assist the origin server 302 in disseminating content to various requesting user devices, and may be arranged in multiple layers (in this example) or in a single layer. The caches (e.g., intermediate caches) 306 and 308 may be arranged in the first layer that is closest to the origin servers 302. One cache 306 may provide content service to user devices located in a geographic area, such as on the east coast of the United States. Another cache 308 may provide content service to user devices located on the west coast of the United States. Other caches (e.g., edge caches) 310-316 may be arranged in the second layer that is closest to the user devices 322-338, and may serve smaller geographic areas, being lower in the cache hierarchy (top of the hierarchy is on the left in FIG. 3A, the origin servers 302, and the bottom of the hierarchy is on the right in FIG. 3A). The cache 310 may provide content service to user devices 322 and 324 located in City 1 on the east coast; the cache 312 may provide content service to user devices 326 and 328 located in City 2 on the east coast; the cache 314 may provide content service to user devices 332 and 334 located in City 3 on the west coast; and the cache 316 may provide content service to user devices 336 and 338 located in City 4 on the west coast. The number of layers of the caches may be any number and is not limited to the number of layer that is described above. Any number of user devices may be connected to each of an edge cache, and the number of user devices is not limited to the numbers described above.

If a user device sends a content request for certain content, the content request may take a path from a lower level to a higher level in the hierarchy. For example, if the user device 322 tunes to HBO, the user device 322 may send a content request for HBO. The content request may take a path from the user device 322 to the edge cache 310. If the edge cache 310 has a manifest file of the content that the user device 322 requested, the edge cache 310 may send the manifest file to the user device 322. The manifest file may be a file that contains information identifying locations, such as network addresses, Uniform Resource Locators (URLs), file paths, etc., where various files for the content may be found. If the edge cache 310 does not have the manifest file, the edge cache 310 may forward the content request to a higher level cache (e.g., the cache 306) until the manifest file is obtained. If the manifest file is located, the manifest file may be forwarded from a higher level to a lower level in the hierarchy (e.g., the origin server 302→the cache 306→the cache 310). The edge cache 310 may store the manifest file. The user device 322 may store the manifest file in a local or remote storage. The user device 322 may retrieve content of HBO according the access addresses of segments listed in the manifest file, and output the content of HBO for display. For example, the user device 322 may consult the manifest file, determine a URL of a first segment to be shown, and send a request to the edge cache 310, requesting the segment indicated by the URL. The URL may identify the edge cache 310. In requesting a segment, the user device 322 may request a particular quality of the segment. For example, various resolution versions of the same segment may be available (e.g., 4K, 1080p, 1080i, 720p, 720i, 540i, 480p, 320i, etc.), and the user device 322 may request a particular version as requested or preferred by a user. As another example, various bitrate versions of the same segment may be available (e.g., 4 Mbps, 3 Mbps 2 Mbps, 1 Mbps, etc.), and the user device 322 may request a particular version as requested or preferred by a user.

The system 300 may include a QoS controller 304, which may be responsible for monitoring the load level of the various origin servers 302, and which may respond to overload situations as described herein. The QoS controller 304 may be separate from other network components in the system 300. Alternatively, the QoS controller 304 may be a part of any one of other network components in the system 300. Alternatively or in addition, the QoS controller 304 may be distributed in the system 300. As will be described below, the QoS controller 304 may detect system overloads at one or more of the network components and may control QoS provided to the user devices 322-338 in response to the system overloads.

The system 300 may include additional network components, for example, one or more of network routers (not shown) that transmit content between the origin servers 302, the caches 306-316, and the user devices 322-338. Similarly, the QoS controller 304 may detect overloads at the network routers and may control QoS provided to the user devices 322-338 in response to the system overloads.

In the example of FIG. 3A, the caches 306 and 316 may be overloaded, while other network components operate in their respective normal operation ranges and are not overloaded. The QoS controller 304 may detect the overloads at the caches 306 and 316. For example, the QoS controller 304 may monitor content traffic at the cache 306, compare the monitored content traffic to pre-stored reference values, and determine that the monitored content traffic is 105% of a normal operation limit of the cache 306. The QoS controller 304 may then determine that, in order to bring the cache 306 back to a normal operation range, a subset of the user devices that are serviced by the cache 306 (e.g., 25% of the user devices 322-328) needs to shift to a lower quality version (e.g., 50% lower than the quality of the current quality version) for future content. The QoS controller 304 may then send one or more downgrade instructions to the cache 306 to indicate the subset and the lower quality version. After receiving the downgrade instructions, the cache 306 may propagate one or more downgrade messages to its next level of caches (e.g., caches 310 and 312). The one or more downgrade messages may indicate 25% of the user devices 322-328 need to downgrade future requests by 50% of the prior requested quality level. Examples of how low the QoS will go are discussed below with respect to FIG. 4. The downgrade messages may be inserted into content items that have been requested by the various user devices 322-328. For example, if any of the user devices 322-328 requests a content segment from any one of the caches 306, 310, and 312, these caches may insert one or more downgrade messages in a content packet including the requested content segment. The downgrade messages may be QoS downgrade headers included in the content sent to the user devices. The QoS downgrade headers may be HTTP headers, or any other types of headers. Further examples of the formatting of the downgrade message will be discussed with respect to FIG. 5 below.

Similarly, the QoS controller 304 may determine that the content traffic at the cache 316 is 113% of a normal operation limit of the cache 316. The QoS controller 304 may determine that, in order to bring the cache 306 back to the normal operation range, a subset of the user devices (e.g., 50% of the user devices 336 and 338) that are serviced by the cache 316 needs to downgrade future requests by 100% of the prior requested quality level. The QoS controller 304 may then send one or more downgrade instructions to the cache 316 to indicate the subset and the downgraded QoS. After receiving the downgrade instructions, the cache 316 may insert corresponding downgrade messages (e.g., QoS downgrade headers) in content packets and send the content packets to the use devices 336 and 338.

In this example, the user devices 332 and 334 need not receive any downgrade messages because they are not receiving content from any overloaded network component.

As shown in FIG. 3B, after the user devices 322-328 receive the requested content (e.g., a content packet including the requested segment), the user devices 322-328 may determine that the content includes downgrade messages indicating that the system requests that 25% of the user devices 322-328 downgrade future requests by 50% of the prior requested quality level. Each of the user devices 322-328 may determine whether it is included in the 25% subset by, for example, generating a random number between 0-100. If the random number falls out of the range of 0-25, the user device may determine to be excluded from the 25% subset and may continue to request whatever quality of content segments they have been requesting (e.g., if a user device 322 was providing a 1080p high-definition resolution version of a particular movie, then the user device 322 may continue to request that resolution version of future segments of the movie). If the random number falls within the range of 0-25, then the user device has been randomly determined to possibly downgrade its future requests, but there may be some exceptions that will allow the user device 322 to maintain its level of service instead of lowering it. The user device may further determine, based on the user profile, if the user device may be excluded from or included in the downgrade subset. For example, if the user device is associated with a higher service level (e.g., paying more for premium cable services) or a high resolution display (e.g., 4k display), the user device may avoid the downgrade. If the user device avoids the downgrade, the user device may continue to request whatever quality of content segments it has been requesting. If the user device cannot avoid the downgrade, the user device will request a lower quality version, for future content, corresponding to 50% of the quality of content segments it has been requesting. For example, the manifest file may include 4 different quality versions of 1080p, 720p, 540i, and 320i (from the highest QoS to the lowest QoS) for a video program or video service. As the user device needs to downgrade future requests by 50% of the prior requested quality level, the user device may switch from the current quality version (e.g., the highest resolution version of 1080p) to 540i (50% lower than the highest quality version of 1080p) for the next segment. In this example, the user device 324 cannot avoid the downgrade, and thus may send a content request for 540i of the next segment. As the user devices 322, 326, and 328 avoid the downgrade, these user devices may continue to request the original quality version (e.g., resolution of 1080p) for the next segment. The user devices 322, 326, and 328 may also curtail their resending activity, if prior requests are unanswered within a predetermined threshold time, because the user devices 322, 326, and 328 may determine that their caches are experiencing overloading. They may reduce the frequency of their retries, and that may serve to avoid making the overloading situation worse. Additional details and examples of the user device operation will be discussed below with respect to FIG. 7.

Similarly, the user devices 336 and 338, connected to the overloaded cache 316, may determine that the content includes downgrade messages indicating that the system requests that 50% of the user devices 336 and 338 downgrade future requests by 100% of the prior requested quality level. Each of the user devices 336 and 338 may determine if it can avoid the downgrade. In this example, the user device 336 cannot avoid the downgrade, and thus will send a content request for 320i (the lowest available quality version) of a next segment. As the user device 338 avoids the downgrade, the user device 338 may continue to request the highest quality version of 1080p for a next segment. By allowing the user devices some autonomy in determining whether to adjust their QoS, the system may allow greater flexibility for supporting different service levels, and may allow the QoS downgrading to be implemented more easily by the QoS controller 304, as only a simple QoS downgrade message is sent. The QoS controller 304 need not (although it may if desired) send individually-addressed requests to individual user devices, or track the QoS demanded by the various user devices.

After the user devices 324 and 336 shift to lower quality versions, the content traffic at the caches 306 and 316 may be reduced, and the caches 306 and 316 may go back to their respective normal operation ranges. The QoS controller 304 may continue to monitor the operations of the system. After the QoS controller 304 detects that the content traffic at the caches 306 and 316 is back to their respective normal operation ranges, the QoS controller 304 may send instructions to the caches 306 and 316 to stop downgrading the user devices that they are servicing. The caches 306 and 316 may then no longer insert any downgrade message in the content packets sent to the user devices 322-328, 336, and 338. After the downgraded user devices 324 and 336 determine that the received content packet no longer includes a downgrade message, the user devices 324 and 336 may resume requesting for the highest available quality version (e.g., 1080p). As such, the system 300 may promptly resolve system overloads by temporarily downgrading one or more consumers and reduce the possibility of system outages due to system overloads.

An overloaded network component may determine to downgrade some of video services, among all the video services that are provided to user devices associated with the overloaded network component, to alleviate an overload situation. For example, an overloaded network component may choose to force the least popular video service(s) to downgrade, to satisfy the downgrade instruction. In the example shown in FIG. 3C, user devices that the east coast cache 306 services may be consuming content of a plurality of video services (e.g., Channel A, Channel B, Channel C, Channel D, and Channel E). The east coast cache 306 may be overloaded (e.g., 105% of a normal operation limit of the east coast cache 306). The east coast cache 306 may be instructed to reduce 25% of the user devices, that the east coast cache 306 services, by 50% of quality of service, such that the overload situation may be alleviated. The east coast cache 306 may determine popularity of Channel A, Channel B, Channel C, Channel D, and Channel E. For example, the east coast cache 306 may determine that 40% of the user devices are consuming content of Channel A, 20% of the user devices are consuming content of Channel B, 15% of the user devices are consuming content of Channel C, 13% of the user devices are consuming content of Channel D, and 12% of the user devices are consuming content of Channel E. The east coast cache 306 may determine that: the most popular channel is Channel A, the $2^{nd}$ popular channel is Channel B, the $3^{rd}$ popular channel is Channel C, the $4^{th}$ popular channel is Channel D, and the least popular channel is Channel E. The east coast cache 306 may determine that 25% of the user devices, that the east coast cache 306 services, are consuming the two least poplar channels, e.g., Channel D and Channel E. The east coast cache 306 may send QoS downgrade headers only to the user devices that are consuming Channel D or Channel E. The QoS downgrade headers may indicate that the user devices that are consuming Channel D or Channel E need to downgrade future requests by 50% of the current quality level. For example, if the target user devices are receiving the 1080p version of Channel D or Channel E, the target user devices may send the next content requests for the 540i version (the quality of the 540i version is 50% lower than the quality of the 1080p version) of Channel D or Channel E.

In another example shown in FIG. 3D, user devices that the west edge cache 316 services may be consuming content of a plurality of video services (e.g., Channel F, Channel G, Channel H, Channel I, and Channel J). The west edge cache 316 may be overloaded (e.g., 113% of a normal operation limit of the west edge cache 316). The west edge cache 316 may be instructed to reduce 50% of the user devices, that the west edge cache 316 services, by 100% of quality of service, such that the overload situation may be alleviated. Similar to the example of FIG. 3C, the west edge cache 316 may determine popularity of Channel F, Channel G, Channel H, Channel I, and Channel J, and may determine that Channel H, Channel I, and Channel J are the three least channels and may determine that 50% of the user devices, that the west edge cache 316 services, are consuming the three least poplar channels, e.g., Channel H, Channel I, and Channel J. The west edge cache 316 may send QoS downgrade headers only to the user devices that are consuming Channel H, Channel I, or Channel J. The QoS downgrade headers may indicate that the user devices that are consuming Channel H, Channel I, or Channel J need to downgrade future requests by 100% of the current quality level. For example, if the target user devices are receiving the 1080p version of Channel H, Channel I, or Channel J, the target user devices may send the next content requests for the 320i version (as the 320i version is the lowest quality version available, the quality of 320i version is deemed to be 100% lower than the quality of the 1080p version) of Channel H, Channel I, or Channel J.

The number of QoS controllers, the origin servers, intermediate caches, edge caches, or the user devices may be any number and is not limited to the quantities shown in FIGS. 3A and 3B or described above.

Figure 4:
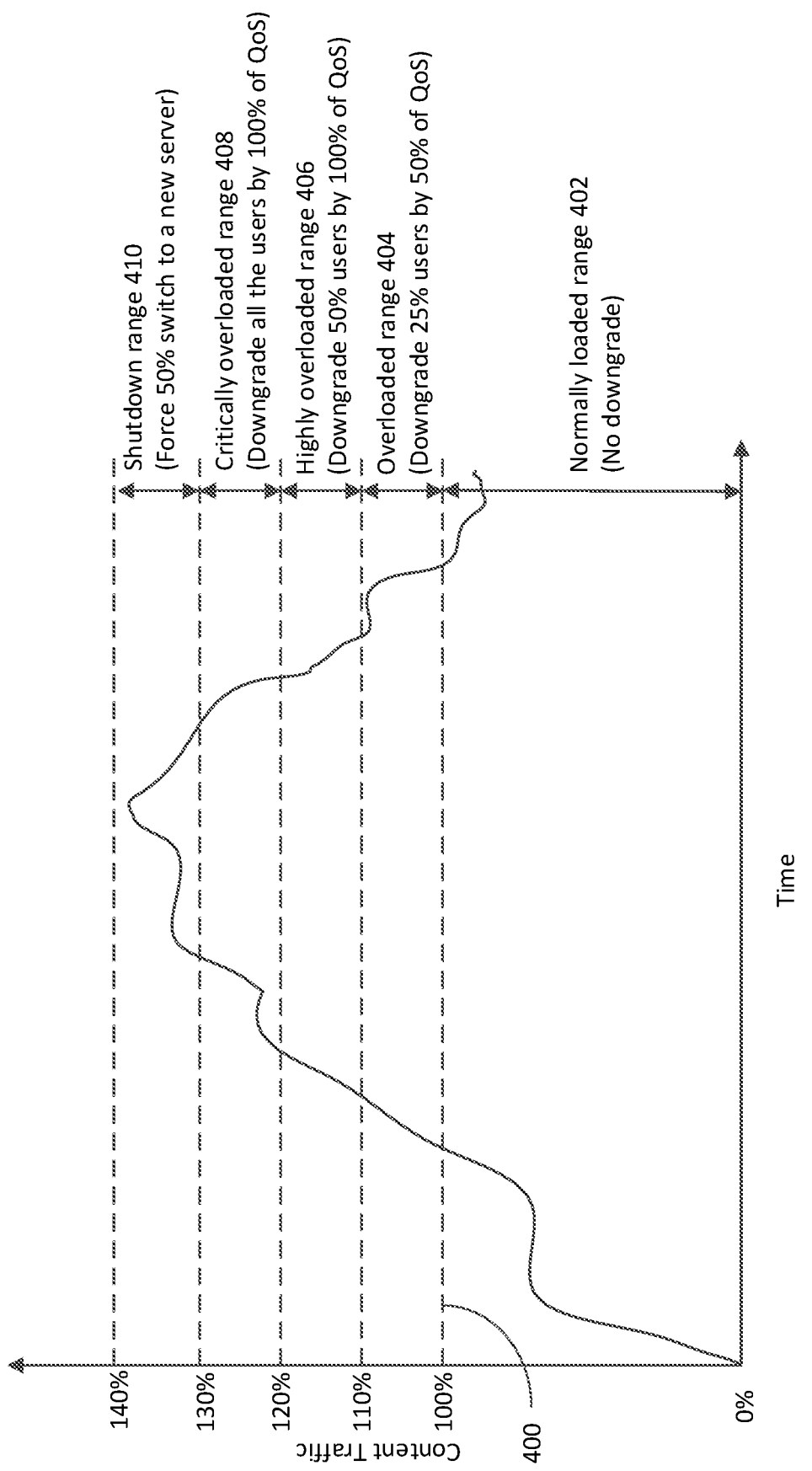
FIG. 4 shows an example of operation ranges of a content delivery system.

The QoS controller 304 may send different downgrade instructions to a network component according to different downgrade operation ranges of the network component. FIG. 4 shows an example of operation ranges of a network component of a content delivery system over a time period (e.g., a day). The network component may be any network component in the system. For example, the network component may be an origin server, a cache, a network router, etc. Each network component may process (e.g., receive, send, encode, decode, etc.) content. User devices may send content requests to an edge cache, and the edge cache may send the requested content to the user devices. Content traffic may be overall data processed by the edge cache, and may comprise data representing the content requests and data representing the requested content. If the edge cache receives too many content requests, from the user devices, at a time period, the data traffic (e.g., data traffic for transmitting the content requests from the user devices to the edge cache, and/or data traffic for transmitting content, from the edge cache to the user devices, in response to the content requests) at the edge cache may increase to an overload point where the content processing at the edge cache may slow down. If the edge cache is overloaded, one or more of the user devices may fail to receive the content they requested. These user devices may send additional content requests (retries) for the content they failed to receive. The content traffic at the edge cache may be further increased and the overload may be worse. To relieve the overload, the system may send downgrade messages to the user devices to request that at least one of the user devices downgrade future requests for content (e.g., requesting a lower quality version of next segments). The quality downgrade may allow the edge cache to process smaller amounts of data representing the content sent to the user devices, and may reduce the number of the retries because the lower quality of content is simpler for the edge cache to process and a success rate of content delivery may be increased. Also, if a user device receives downgrade messages, the user device may reduce a frequency of retries for unanswered content requests (e.g., increasing a time threshold for sending a retry). As such, the overall content traffic at the edge cache may be reduced and the overload may be resolved.

A network component may comprise one or more operation ranges, for example, a normally loaded range 402 and one or more downgrade operation ranges (e.g., an overloaded range 404, a highly overloaded range 406, a critically overloaded range 408, and a shutdown range 410, etc.). A normal maximum content traffic 400 indicates the maximum content traffic that the network component can handle without slowdown.

In the normally loaded range 402 (e.g., 0-100% of the normal maximum content traffic 400), the network component may fulfill all the received content requests. In the normally loaded range 402, the network component operates normally and does not slow down. If the QoS controller 304 determines that the content traffic at the network component is within the normally loaded range 402, the QoS controller 304 may determine that none of the user devices needs to be downgraded. In this case, the QoS controller 304 may send a message to the network component to indicate that no downgrade is needed, so the network component need not downgrade any of the user devices serviced by the network component.

In the overloaded range 404 (e.g., 100%-110% of the normal maximum content traffic 400), the content processing at the network component may slow down. Some user devices associated with the network component may fail to download content they requested. The QoS controller 304 may determine that some user devices need to be downgraded such that the network component may return to the normally loaded range 402. If the QoS controller 304 determines that the content traffic at the network component falls in the overloaded range 404, the QoS controller 304 may determine that a quantity (e.g., a percentage such as 25%) of the user devices serviced by the network component need to downgrade future requests by a certain degree (e.g., 50%) of the prior requested quality level. In some cases, the user device may determine the downgraded QoS by multiplying the current quality by the downgrade degree (e.g., 50%). For example, if an affected user device (e.g., a user device included in the 25% subset) previously requested the 1080p version of content, the affected user device may receive the 1080 version of content it requested and then shift to request the 540i version (lowered by 50% compared to 1080p) of future content. If an affected user device previously requested the 720p version of content, the affected user device may receive the 720p version of content it requested and shift to request the 360p version (lowered by 50% compared to 720p) of future content.

In some cases, the strict percentage is unable to translate directly. For example, there may be only four different quality versions (e.g., 1080p, 720p, 540i, and 320i) available for same content. An affected user device may need to downgrade by 90% of QoS. If the current quality version is 1080p, the target downgrade quality may be 10% of 1080p, which is unavailable. The user device may determine that a quality version (e.g., 320i), from all the available bitrate versions (e.g., 1080p, 720p, 540i, and 320i), that is closest to the target downgraded quality is the final downgraded bitrate version. In some other examples, the amount of quality drop may be indicated by "drop 1 level" or "drop 2 levels," rather than a percentage. For example, the QoS controller 304 may determine that 25% of the user devices serviced by the network component need to downgrade future requests 1 level below the prior requested quality level. If an affected user device previously consumed the 1080p version of content, the affected user device may shift to the 720p version (1 level below 1080p) of content.

The QoS controller 304 may send a downgrade instruction to the network component to indicate that 25% of the user devices associated with the network component need to downgrade future requests by 50% of the prior requested quality level. After receiving such a downgrade instruction, the network component may insert one or more downgrade messages in the content sent to all the user devices serviced by the network component (or receiving a particular content item), where the one or more downgrade messages may indicate that 25% of the user devices serviced by the network component need to downgrade future requests by 50% of the prior requested quality level.

In the highly overloaded range 406 (e.g., 110%-120% of the normal maximum content traffic 400), the content processing at the network component may further slow down. More user devices may fail to download content they requested. If the QoS controller 304 determines that content traffic at the network component is within the highly overloaded range 406, the QoS controller 304 may determine that more (e.g., 50%) of the user devices serviced by the network component need to downgrade future requests by 100% of the prior requested quality level (e.g., to the lowest quality version), such that the network component may return to the normally loaded range 402. The QoS controller 304 may send a downgrade instruction to the network component to indicate that 50% of the user devices associated with the network component need to downgrade future requests by 100% of the prior requested quality level (a 100% reduction may result in the lowest available quality level). After receiving such a downgrade instruction, the network component may insert one or more downgrade messages in the content sent to all the user devices associated with the network component, where the one or more downgrade messages may indicate that 50% of the user devices associated with the network component need to downgrade to the lowest quality version.

If the network component operates in the critically overloaded range 408 (e.g., 120%-130% of the normal maximum content traffic 400), the QoS controller 304 may determine all of the user devices associated with the network component must downgrade future requests by 100% of the prior requested quality level (e.g., to the lowest quality version). The QoS controller 304 may send a downgrade instruction to the network component to indicate that all of the user devices associated with the network component must downgrade future requests to the lowest quality version. After receiving such a downgrade instruction, the network component may insert a force downgrade message in the content sent to all the user devices serviced by the network component, where the force downgrade message indicates that the recipients must downgrade future requests to the lowest quality version.

If the network component operates in the shutdown range 410 (e.g., 130%-140% of the normal maximum content traffic 400), the QoS controller 304 may determine that a certain quantity of the user devices serviced by the network component need to switch to a new content server (e.g., a different content server that includes similar content encoded in same or different formats), otherwise a system outage may occur. The QoS controller 304 may send a downgrade instruction to the network component indicating that that a certain quantity (e.g., 50%) of the user devices associated with the network component need to switch to a new content server. After receiving such a downgrade instruction, the network component may randomly pick 50% of the user devices and insert a switch-server message in the content sent to the 50% of user devices to force these user devices to switch to a new content server.

Alternatively or in addition, the network component may target subsets of user devices to receive the downgrade and/or server switch messages. For example, if the network component determines that 50% of the user devices are closer to the new content server (e.g., less routers in between) compared to the other 50% of the user devices, the network component may pick the 50% of the user devices that are closer to the new content server as the 50% to be switched, and send the switch-server message to the 50% switch server subset and force them to switch to the new content server. As another example, the new content server may provide same content but encoded in a different content format (e.g., MOV) compared to the current content format (e.g., AVCHD). The network component may determine user devices having the capacity of displaying the MOV format and include one or more of these user devices in the 50% switch-server subset. The network component may send the switch-server message to the 50% switch-server subset to force them to switch to the new content server. The network component may also insert an additional message (e.g., an additional header) indicating an address of the new content server for the 50% switch-server subset to connect to the new content server.

If the content traffic exceeds 140% of the normal maximum content traffic 400, the network component may breakdown, and none of the user devices serviced by the network component can get content they request.

The operation ranges may be any ranges and are not limited to the ranges described above.

Different network components may have same or different operation ranges, and/or may have same or different numbers of operation ranges. Content traffic ranges of a same network component may be changed or updated based on software updates, user settings, etc. The QoS controller 304 may communicate with the network components to obtain the changed or updated content traffic ranges.

As discussed previously, after the network component receives downgrade instructions from the QoS controller 304, the network component may send corresponding downgrade messages to the user devices. The network component may include the downgrade messages (e.g., as QoS downgrade headers) in a header section of a content packet that has been requested by the user devices, in which case the system does not need to generate an additional communication path for sending the downgrade messages to the user devices, thereby saving the bandwidth. According to different downgrade operation ranges of the network component, the network component may send different QoS downgrade headers to the user devices.

Figure 5:
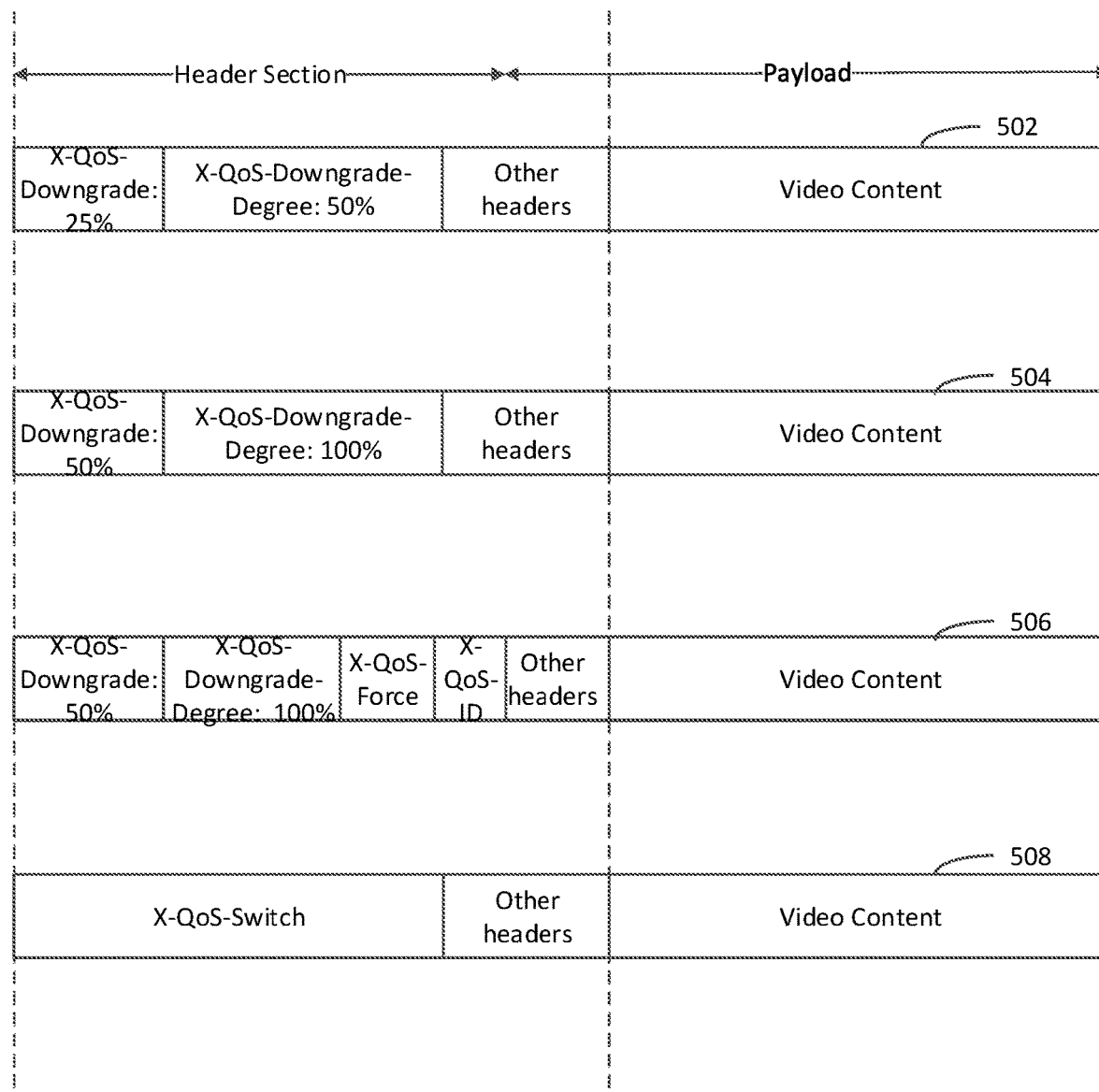
FIG. 5 shows examples of messages that may be included with video content.

FIG. 5 shows examples of content packets including different downgrade messages corresponding to different downgrade operation ranges of the network component, respectively. A content packet may be a video packet. For example, a content packet 502 may correspond to the overloaded range 404; a content packet 504 may correspond to the highly overloaded range 406; a content packet 506 may correspond to the critically overloaded range 408; and a content packet 508 may correspond to the shutdown range 410. Each of the content packets 502-508 may include a header section that includes one or more headers, and a payload. The payload may include content of a certain quality version of a video segment requested by the user device. The header section may include QoS downgrade headers (described below) indicating downgrade strategies and other headers indicating other information about the content (e.g., bitrate of the content, a length of the content, an access address from which the content may be retrieved, identification of a content provider providing the content, etc.), information about the content request (e.g., the time when the content request was generated, etc.), information about the user device (e.g., an address of the user device, etc.), information about the network component (e.g., an address of the network component, etc.), information about the origin server storing the content (e.g., an address of the origin server, etc.), or any other information about content and/or the system.

The content packet 502 may include downgrade messages, e.g., a QoS downgrade header (e.g., X-QoS-Downgrade) indicating a quantity (e.g., a percentage such as 25%) of the user devices that are to be downgraded, and a QoS downgrade header (e.g., X-QoS-Downgrade-Degree) indicating a degree (e.g., 50% of the prior requested quality level) by which the user devices need to downgrade for future requests. In some examples, the content packet 502 may include QoS downgrade headers indicating multiple lower quality levels for the user devices to choose from. For example, the content packet 502 may include a header indicating that the user device may downgrade to either 1 level below the current quality or 2 levels below the current quality. The user device may choose to downgrade either 1 level below or 2 levels below.

The content packet 504 may include QoS downgrade headers, e.g., X-QoS-Downgrade and X-QoS-Downgrade-Degree, that indicate more user devices need to be downgraded to a lower QoS. The X-QoS-Downgrade may be a percentage (e.g., 50%) indicating that the system requests that 50% of the user devices associated with the network component be downgraded. The X-QoS-Downgrade-Degree may be a percentage (e.g., 100%) indicating that the affected user devices need to downgrade future requests by 100% of the prior requested quality level.

If a user device receives the content packet 502 or 504, the user device may voluntarily decide whether to downgrade the demands they are placing on the network element.

Compared to the content packets 502 and 504, the content packet 506 may include an additional force downgrade message, e.g., a QoS force downgrade header: X-QoS-Force. The force QoS downgrade header may force the recipient to downgrade to a quality version indicated by the X-QoS-Downgrade-Degree. Alternatively or additionally, the content packet 506 may include a QoS downgrade header (e.g., X-QoS-ID) to indicate identification (e.g., Internet Protocol (IP) address or MAC address) of one or more user devices that the system determines to downgrade. For example, instead of allowing the user devices to determine whether to abide by the downgrade, the system may take over the determination based on the user profiles. The system may send the content packet 506 (including the identification of the target user devices) to the target user devices and force specific target user devices to downgrade. The user devices may compare their respective identification to the identification included in the downgrade message, and downgrade themselves if a match is determined. The downgraded user devices may also reduce the frequency of retries for unanswered content requests. The user devices, whose addresses do not match the identification included in the downgrade message, do not need to downgrade, but may be aware of the system overload based on the downgraded message and may reduce the frequency of retries for unanswered content requests. In some other cases, identification of the target user devices may be omitted from the content packet 506. The system may send the content packet 506 only to the target user devices based on their addresses, and send content packets that do not include any QoS downgrade headers to the user devices that do not downgrade. In these cases, only the target user devices downgrade and reduce the frequency of retries for unanswered content requests, and others do not.

The content packet 508 may include a switch-server message (e.g., switch-server header), e.g., X-QoS-Switch, to force the recipient to switch to a new content server. The other headers of the content packet 508 may include an additional header indicating an address of the new content server for the user devices to connect to.

The QoS downgrade headers are not limited to the examples described above, and may be any header that indicates a downgrade strategy. For example, the X-QoS-Downgrade of the content packet 506 may be omitted because the recipient must downgrade regardless the percentage of the user devices that the system needs to downgrade.

A network component (e.g., the cache 306) may determine to downgrade an entire content service, or multiple content services, to alleviate an overload situation. For example, if a downgrade instruction instructs a network element to reduce its load by 25%, the network component may choose to force the least popular services to downgrade, to satisfy the downgrade instruction. The network component may select one or more services based on lowest popularity (e.g., HBO may be selected for downgrade if it is the least popular channel among all the channels being consumed by the user devices serviced by the cache 306). The cache 306 may send QoS downgrade headers only to the user devices that are consuming those low-popularity services. The QoS downgrade headers may indicate a degree of the downgrade. Based on the QoS downgrade headers, the target user device may send the next content request for a lower quality version of the service (e.g., HBO) according to the degree of the downgrade. Additionally or alternatively, the QoS downgrade headers may indicate that the downgrade may be applied to requests for other content as well. For example, if a user device is consuming HBO and receives the downgrade messages, the downgrade messages may apply to the user device's next request for another video service. If the user device changes channel from HBO to NBC, the user device may downgrade content requests for NBC to the lower quality version according to the degree of the downgrade.

In some cases, the X-QoS-Force (and optionally the X-QoS-ID) may be used in either the overloaded range 404 or the highly overloaded range 406. For example, in the overloaded range 404, the system may determine that 25% of the user devices need to downgrade future requests by 50% of the prior requested quality level. Instead of allowing the user devices to determine whether to abide by the downgrade, the system may take over the determination based on the user profiles. For example, the system may identify 30% of the user devices to be the candidates for downgrade because they have small display devices, are located in moving vehicles, are associated with a low service level, and/or on a cellular network. The system may randomly select a portion of 30% of the user devices to be the 25% of the user devices that are to be downgraded. The system may insert the X-QoS-Force (and optionally the X-QoS-ID) in the content packet 502, and force the chosen user devices to downgrade.

Figure 6:
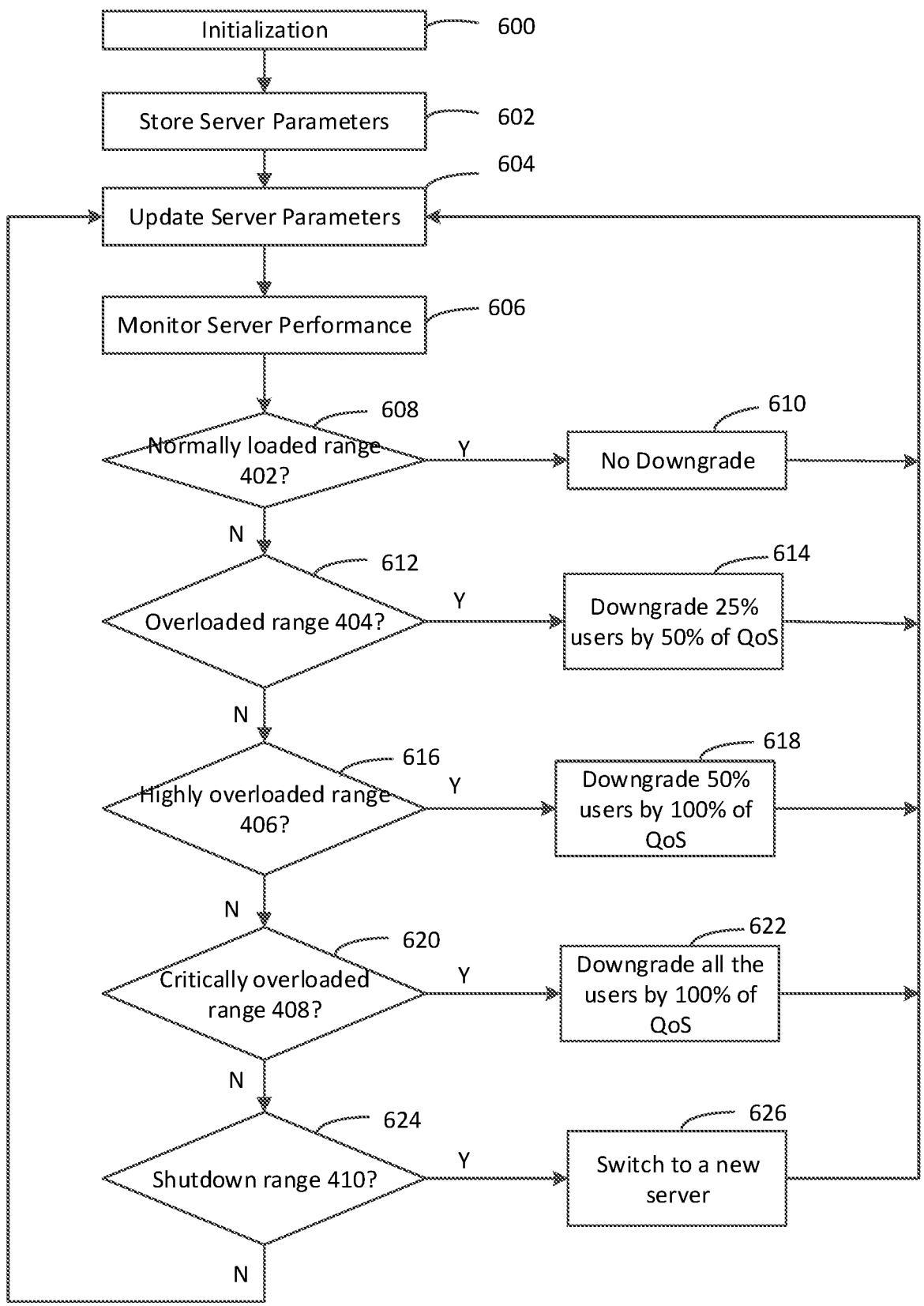
FIG. 6 shows an example method for an operation of a content delivery system.

FIG. 6 is a flow chart showing an example method for an operation of a content delivery system and associated components, such as the QoS controller 304. The process may begin at step 600 where the QoS controller 304 is initialized. At step 600, the QoS controller 304 may be powered on. The QoS controller 304 may connect to network components in the system and exchange data with one or more of the network components.

At step 602, the QoS controller 304 may identify one or more of the network components and store their server parameters in a local or remote storage. The network components may send their identifications (e.g., unique identifiers) and their server parameters (e.g., operation ranges) to the QoS controller 304. Based on the received unique identifiers, the QoS controller 304, or an associated computing device, may determine a network configuration, for example, that the network component 302 is an origin server, the network components 306 and 308 are intermediate caches, and the network components 310-316 are edge caches. The QoS controller 304 may determine, for one or more of the network components, downgrade strategies according their respective operation ranges, and pre-store the downgraded strategies in a storage. The QoS controller 304 may store the server parameters and corresponding downgrade strategies for the origin servers 302 and the caches 306 and 308 as shown in the following table:

other cases, different origin servers may have different content processing capacities and may have different downgrade operation ranges.

Similarly, the intermediate caches 306 and 308 may have same or different downgrade operation ranges and downgrade strategies. In this example, the caches 306 and 308 may have the same downgrade operation ranges and downgrade strategies.

Similarly, the edge caches 310-316 may have same or different downgrade operation ranges and downgrade strategies. For example, City 4 may have a larger population compared to Cities 1-3. Accordingly, the edge cache 316 servicing the larger City 4 may have a higher processing capacity compared to other edges caches 310-314 servicing the smaller Cities 1-3. For example, the highly overloaded range 406, the critically overloaded range 408, and the shutdown range 410 of the edge cache 316 may be higher than those of the edge caches 310-314.

The network components indicated in the above table may have same or different downgrade ranges and corresponding downgrade strategies. For example, some of the network

|  | Over loaded | Highly Over loaded | Critically Overloaded | Shut Downgrade | Overloaded down | Highly Overloaded Downgrnde | Critically Overloaded Downgrnde | Shutdown Downgrade |
|---|---|---|---|---|---|---|---|---|
| Origin 302 #1 | 100%-115% | 115%-125% | 125%-140% | 140%-150% | 20% (User) 50% (QoS) | 40% (User) 100% (QoS) | 40% (User) 100% (QoS) | 40% (User) |
| Origin 302 #2 | 100%-115% | 115%-125% | 125%-140% | 140%-150% | 20% (User) 50% (QoS) | 40% (User) 100% (QoS) | 40% (User) 100% (QoS) | 40% (User) |
| Origin 302 #3 | 100%-115% | 115%-125% | 125%-140% | 140%-150% | 20% (User) 50% (QoS) | 40% (User) 100% (QoS) | 40% (User) 100% (QoS) | 40% (User) |
| Cache 306 | 100%-110% | 110%-120% | 120%-130% | 130%-140% | 25% (User) 50% (QoS) | 50% (User) 100% (QoS) | 50% (User) 100% (QoS) | 50% (User) |
| Cache 308 | 100%-110% | 110%-120% | 120%-130% | 130%-140% | 25% (User) 50% (QoS) | 50% (User) 100% (QoS) | 50% (User) 100% (QoS) | 50% (User) |
| Cache 310 | 100%-110% | 110%-115% | 115%-125% | 125%-130% | 25% (User) 50% (QoS) | 50% (User) 100% (QoS) | 50% (User) 100% (QoS) | 50% (User) |
| Cache 312 | 100%-110% | 110%-115% | 115%-125% | 125%-130% | 25% (User) 50% (QoS) | 50% (User) 100% (QoS) | 50% (User) 100% (QoS) | 50% (User) |
| Cache 314 | 100%-110% | 110%-115% | 115%-125% | 125%-130% | 25% (User) 50% (QoS) | 50% (User) 100% (QoS) | 50% (User) 100% (QoS) | 50% (User) |
| Cache 316 | 100%-110% | 110%-120% | 120%-130% | 130%-140% | 25% (User) 50% (QoS) | 50% (User) 100% (QoS) | 50% (User) 100% (QoS) | 50% (User) |

For example, each network component may have respective downgrade operation ranges as discussed above with respect to FIG. 4. There may be three origin servers 302, where an origin server #1 may provide video programs, e.g., Game of Thrones, Star Wars, etc.; an origin server #2 may provide content of NBC; and an origin server #3 may provide content of ABC. The origin servers 302 may have the same content processing capacity (e.g., having same downgrade operation ranges). Each of the origin servers 302 may have the overloaded range 404 of 100%-115%, the highly overloaded range 406 of 115%-125%, the critically overloaded range 408 of 125%-140%, and the shutdown range 410 of 140%-150%. If the content traffic falls within the overloaded range 404, 20% of the associated user devices need to downgrade future requests by 50% of the prior requested quality level. If the content traffic falls within the highly overloaded range 406, 40% of the associated user devices need to downgrade future requests by 100% of the prior requested quality level. If the content traffic falls within the critically overloaded range 408, 40% of the associated user devices need to downgrade future requests by 100% of the prior requested quality level. If the content traffic falls within the shutdown range 410, 40% of the associated user devices need to be switched to a new content server. In some components may have more escalating downgrade ranges while others may have less. The above table may store additional information associated with the network components. For example, the above table may further include a value of the normal maximum content traffic 400, information about the content that each of the origin servers 302 provides, etc. Values listed in the above table may be any values, and are not limited to the values as shown. The above table may be stored in a local or remote storage that is accessible by one or more of the QoS controller, origin servers, caches, network routers, or other network components.

The QoS controller 304 may communicate with the user devices and store the user profiles. The above table may further include the user profiles. For example, the QoS controller 304 may store data indicating that the user device 322 is associated with a high service level, and the user device 326 has a high resolution display (e.g., a 4k display), etc. If the cache 306 is overloaded, instead of transmitting the downgrade messages to all the associated user device 322-328, the system may select a downgrade subset based on the user profiles and force the subset to downgrade. For example, since the user devices 322 and 328 are associated with a high service level and the user device 326 is associated with a 4k display, the QoS controller 304 may exclude the user devices 322, 326 and 328 from downgrade, and pick the user device 324 (e.g., associated with a low service level) to downgrade. The QoS controller 304 may instruct the cache 306 to include a QoS force downgrade header in the content sent to the user device 324 and force this user device to downgrade. For example, the cache 306 may include X-QoS-ID in the content packet to indicate the identification of the user device 324. Based on the identification, the user device 324 may downgrade. Since the identification of the user device 324 does not match those of the user devices 322, 326 and 328, the user devices 322, 326 and 328 do not need to downgrade. In some other examples, the cache 306 need not send any downgrade header to the user devices 322, 326 and 328.

At step 604, the QoS controller 304 may keep the server parameters and/or the user profiles up to date. For example, the server parameters and/or the user profiles may change based on software update, removal of network component(s), removal of user device(s), addition of new network component(s), addition of new user device(s), or other changes in the system. If such changes occur, the QoS controller 304 may be notified with the changes, e.g., by receiving updated server parameters from an updated network component, by receiving new server parameters from a newly added network component, by receiving an indication of removal of a network component, or etc. The QoS controller 304 may update entries in the table by replacing the outdated data with the updated data, by adding new entries to list the server parameters for new network components, by deleting entries associated with removed network component, or etc.

At step 606, the QoS controller 304 may monitor the performance of one or more of the network components. For example, the QoS controller 304 may monitor the content traffic at a network component (e.g., the cache 306) and compare the content traffic with the normal maximum content traffic 400.

At step 608, the QoS controller 304 may determine whether the content traffic of the cache 306 falls in the normally loaded range 402. If the content traffic falls in the normally loaded range 402, the process may proceed to step 610 at which the QoS controller 304 may determine that no user device needs to be downgraded. The QoS controller 304 may send instructions to the cache 306 to indicate that no downgrade is needed.

Alternatively, if the content traffic is below the normal maximum content traffic 400, the QoS controller 304 need not send any instruction to the cache 306. If the cache 306 determines that no instruction is received from the QoS controller 304 for a certain time period (e.g., for the past 6 seconds), the cache 306 may determine not to downgrade any user device that the cache 306 services. The process may then return to step 604 at which the QoS controller 304 may continue to keep the server parameters and the user profiles up to date.

If the content traffic does not fall in the normally loaded range 402, the process may proceed to step 612. At step 612, the QoS controller 304 may look up the above table and determine if the content traffic falls in the overloaded range 404 (e.g., 100%-110% for the cache 306). If the QoS controller 304 determines that the content traffic falls in the overloaded range 404, the process may proceed to step 614. At step 614, the QoS controller 304 may look up the above table and determine that the downgrade strategy for the initial downgrade operation range is that 25% of the user devices serviced by the cache 306 need to downgrade future requests by 50% of the prior requested quality level. The QoS controller 304 may send a downgrade message to instruct the cache 306 that 25% of the user devices need to downgrade future requests by 50% of the prior requested quality level. After receiving the downgrade message, the cache 306 may transmit the QoS downgrade headers (e.g., QoS downgrade headers in the content packet 502) to all the user devices 322-328 associated with the cache 306. The user devices 322-328 may receive content packets 502. The process may then return to step 604 at which the QoS controller 304 may continue to keep the server parameters and the user profiles up to date.

In some cases, transmitting downgrade messages to all the associated user devices may worsen the overload. In these cases, instead of transmitting the QoS downgrade headers to all the associated user devices associated with (e.g., serviced by) a network component (e.g., the cache 306), the system may only insert the QoS downgrade headers in the content packets that are sent to particular targeted user devices (e.g., user device that are consuming the least popular video program(s) or video service(s)) among all the associated user devices. The quantity of the particular targeted user devices may meet the required downgrade percentage of the associated user devices (e.g., 25% of the associated user devices need to be downgraded to bring the network component back to the normal operation range). For example, the associated user devices may be consuming a plurality of video services (e.g., streaming services such as Netflix or YouTube, or channels such as HBO, HGTV, ABC, CNN, FOX, etc.). Different user devices may request different quality versions of a same service content from the network component. The network component (e.g., the cache 306) may store multiple quality versions for each of the plurality of video services, such that different user devices may get corresponding quality versions of the content they request. If the QoS downgrade headers (e.g., indicating 25% user devices need to downgrade future requests by 100% of the prior requested quality level) are transmitted to all the associated user devices, 25% of the user devices may downgrade and request for the lowest quality version (e.g., 320i) of content, and 75% of the user devices may avoid the downgrade and continue to request for the highest available quality version (e.g., 1080p) of content. Some of the downgraded user devices may request the 320i version of FOX and some of the downgraded user devices may request the 320i version of CNN, while some of the not-downgraded user devices may request for the 1080p version of FOX and some of the not-downgraded user devices may request for the 1080p version of CNN. To fulfill all these content requests, the overloaded network component may need to store and maintain: the 1080p version of FOX, the 320i version of FOX, the 1080p version of CNN, the 320i version the CNN, and/or the manifest files that list access addresses of segments of all the above versions of FOX and CNN. Storing multiple quality versions and/or manifest files of multiple quality versions may require additional resource and may sometime worsen the overload.

To resolve this problem, the network component may rank the content items in popularity (e.g., streaming services or channels, from the most popular to the least popular), and may cause less popular channels to drop in quality for all users watching those channels. In some cases, no user devices, associated with the network component, watching those less popular channels may be excluded from the downgrade. The QoS controller 304 or the network component may determine numbers of user devices that are consuming corresponding video channels. The QoS controller

304 may determine that the number of user devices consuming the least popular service (e.g., FOX) is less than 25% of the associated user devices, that is required by the downgrade message. The QoS controller 304 or the network component may add the number of user devices consuming FOX (the $2^{nd}$ least popular channel) to the number of user devices consuming CNN, and may determine that the total number is equal to or greater than 25% of the associated user devices and meet the required downgrade percentage of the associated user devices. The QoS controller 304 or the network component may identify all the user devices consuming FOX or CNN (e.g., based on service identifiers included in the content requests, and the IP or MAC addresses, of the user devices, included in the content requests), and include the QoS force downgrade headers into content packets sent to the identified IP or MAC addresses to force the recipients to downgrade to 320i. As such, all the user devices (of the user devices serviced by the network component) consuming FOX and CNN will downgrade, and user devices consuming HBO, HGTV, ABC will not downgrade. Since the downgraded user devices may request only the 320i versions for FOX and CNN, the network component only need to store and maintain the 320i versions for FOX and CNN and need not reserve storage for the 1080p versions for FOX and CNN. Thus, the resource at the network component may be saved and the overload may be relieved. In some cases, the network component need not send any QoS downgrade headers to the user devices that are watching HBO, HGTV, and ABC. More or less channels may be downgraded depending on the required downgrade percentage of the associated user devices. For example, if the number of user devices consuming FOX is more than 25% of the associated user devices, the QoS controller 304 or the network component may determine to downgrade only the user devices consuming FOX, and user devices consuming CNN, ABC, HBO and HGTV do not need to downgrade. As another example, if the QoS controller 304 or the network component determines that the user devices consuming ABC needs to be further included to the downgraded subset to meet the 25% downgrade requirement, the user devices consuming FOX, CNN, and ABC need to downgrade, and user devices consuming HBO and HGTV do not need to downgrade.

In some cases, in addition to looking up the above table, the QoS controller 304 may determine, based on the value of the overload, the percentage of the user devices that need to be downgraded and the downgrade degree of the QoS. For example, the QoS controller 304 may determine that the content traffic at the cache 308 is 105% of the normal maximum content traffic 400. The QoS controller 304 may determine that the cache 308 is overloaded by 5% (105% minus 100%) of the normal maximum content traffic 400, and the upper limit (110%) of the overloaded range 404 indicates that the cache 308 is overloaded by 10% (110% minus 100%) of the normal maximum content traffic 400. The QoS controller 304 may determine that based on the above table, downgrading 25% of the user devices may reduce the content traffic by 10% (110% minus 100%) of the normal maximum content traffic 400, so downgrading 12.5% (25%/2) may reduce the content traffic by 5% (10%/2). Accordingly, the QoS controller 304 may determine that: to reduce the content traffic from 105% to 100%, only 12.5% (instead of 25% as shown in the above table) of the user devices need to be downgraded. Thus, less user devices may be impacted by the downgrade.

If the content traffic does not fall in the overloaded range 404, the process may proceed to step 616 at which the QoS controller 304 may determine if the content traffic falls in the highly overloaded range 406 (e.g., 110%-120% for the cache 306). If the content traffic falls in the highly overloaded range 406, the process may proceed to step 618. Similar to step 614, at step 618, the QoS controller 304 may determine that the downgrade strategy is to downgrade 50% of the user devices serviced by the cache 306 by 100% of the quality of service. The QoS controller 304 may send a downgrade instruction to instruct the cache 306 to downgrade 50% of the user devices it services by 100% of QoS. The process may then return to step 604 at which the Qos controller 304 may continue to keep the server parameters and the user profiles up to date.

If the content traffic does not fall in the highly overloaded range 406, the process may proceed to step 620 at which the QoS controller 304 may determine if the content traffic falls in the critically overloaded range 408 (e.g., 120%-130% for the cache 306). If the content traffic falls in the critically overloaded range 408, the process may proceed to step 622. At step 622, the QoS controller 304 may determine that the downgrade strategy is that all the user devices serviced by the cache 306 need to downgrade future requests by 100% of the prior requested quality level (e.g., to the lowest quality level). The QoS controller 304 may then send a downgrade instruction to instruct the cache 306 to force all the user device to downgrade future requests to the lowest quality version. The process may return to step 604 at which the QoS controller 304 may continue to keep the server parameters and the user profiles updated.

If the content traffic does not fall in the critically overloaded range 408, the process may proceed to step 624 at which the QoS controller 304 may determine if the content traffic falls in the shutdown range 410 (e.g., 140%-150% for the origin server 302 #1). If the content traffic falls in the shutdown range 410, the process may proceed to step 626. At step 626, the QoS controller 304 may determine that the downgrade strategy is to switch 40% of the user devices to a new content server (e.g., a backup origin server for the origin server 302 #1 that replicates all data maintained by the origin server 302 #1, an alternative origin server that include similar content encoded in same or different formats, etc.). The QoS controller 304 may send a downgrade instruction to the network component indicating that 40% of the user devices associated with the network component need to switch to a new content server. As previously discussed, after receiving such a downgrade instruction, the network component may randomly pick, or pick based on the user profiles, 40% of the user devices, and insert a switch-server header in content packets (e.g., the content packet 508) to force the 40% of the user devices to switch to a new content server.

If the content traffic does not fall in the shutdown range 410, the process may return to step 604 at which the QoS controller 304 may continue to keep the server parameters and the user profiles updated.

The QoS controller 304 and a network component may be combined, and one or more of the steps described in FIG. 6 may be performed by the combined network component. The QoS controller 304 may take over one or more actions (e.g., determining the downgraded user devices, sending QoS downgrade headers to the user devices, etc.) from the network component.

In FIG. 6, the order of the steps may vary. For example, step 606 may be performed before step 604, or steps 604 and 606 may be performed simultaneously. In FIG. 6, some steps may be omitted. For example, if the network component has less escalating downgrade operation ranges, one or more of steps 612, 616, 620, and 624 may be omitted. One or more steps may be added in FIG. 6. For example, if the network component has more escalating downgrade operation ranges, one or more of determination steps associated with additional downgrade operation ranges may be added.

Figure 7:
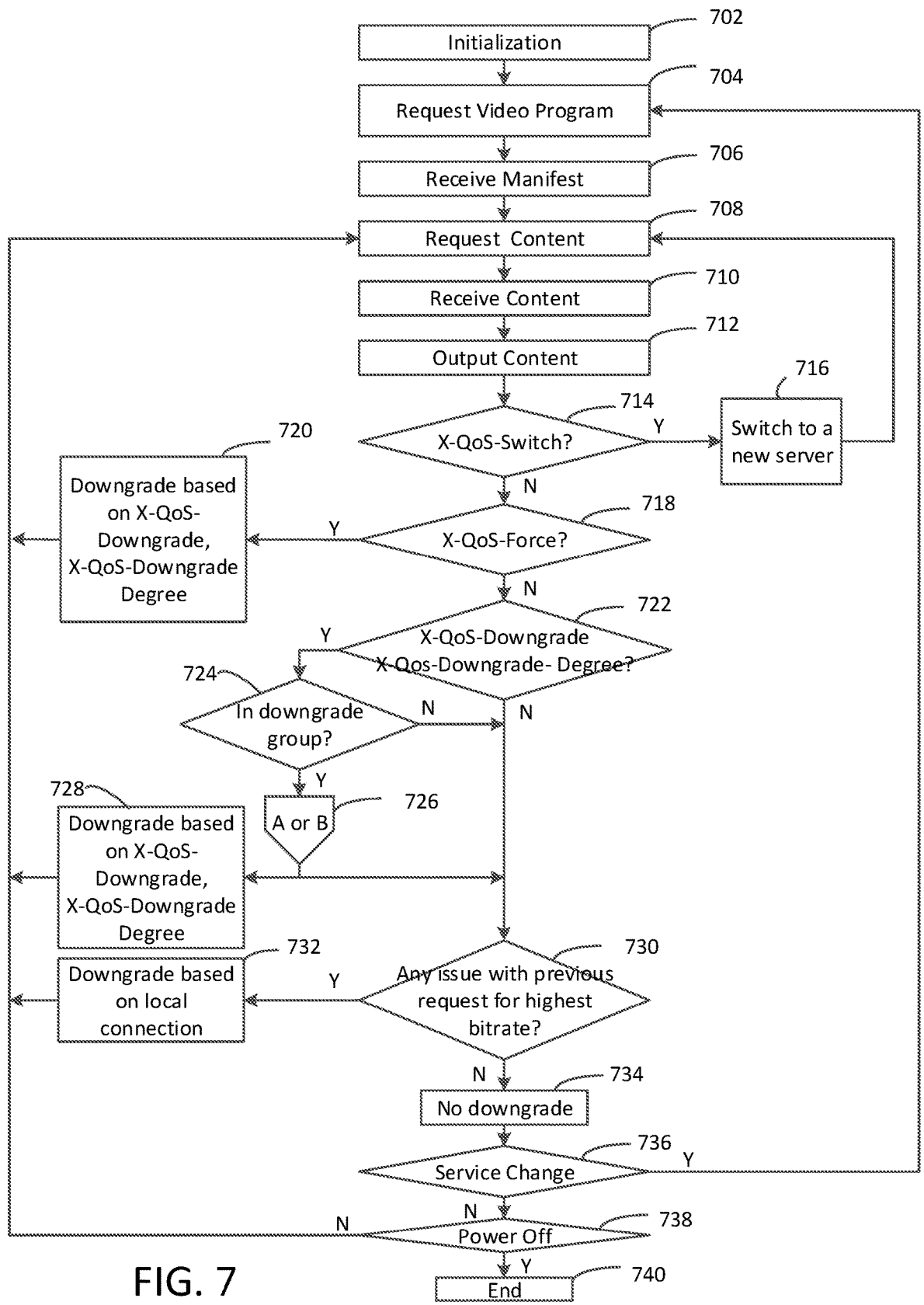
FIGS. 7-9 shows an example method for an operation of a user device and a content delivery system.
Figure 8:
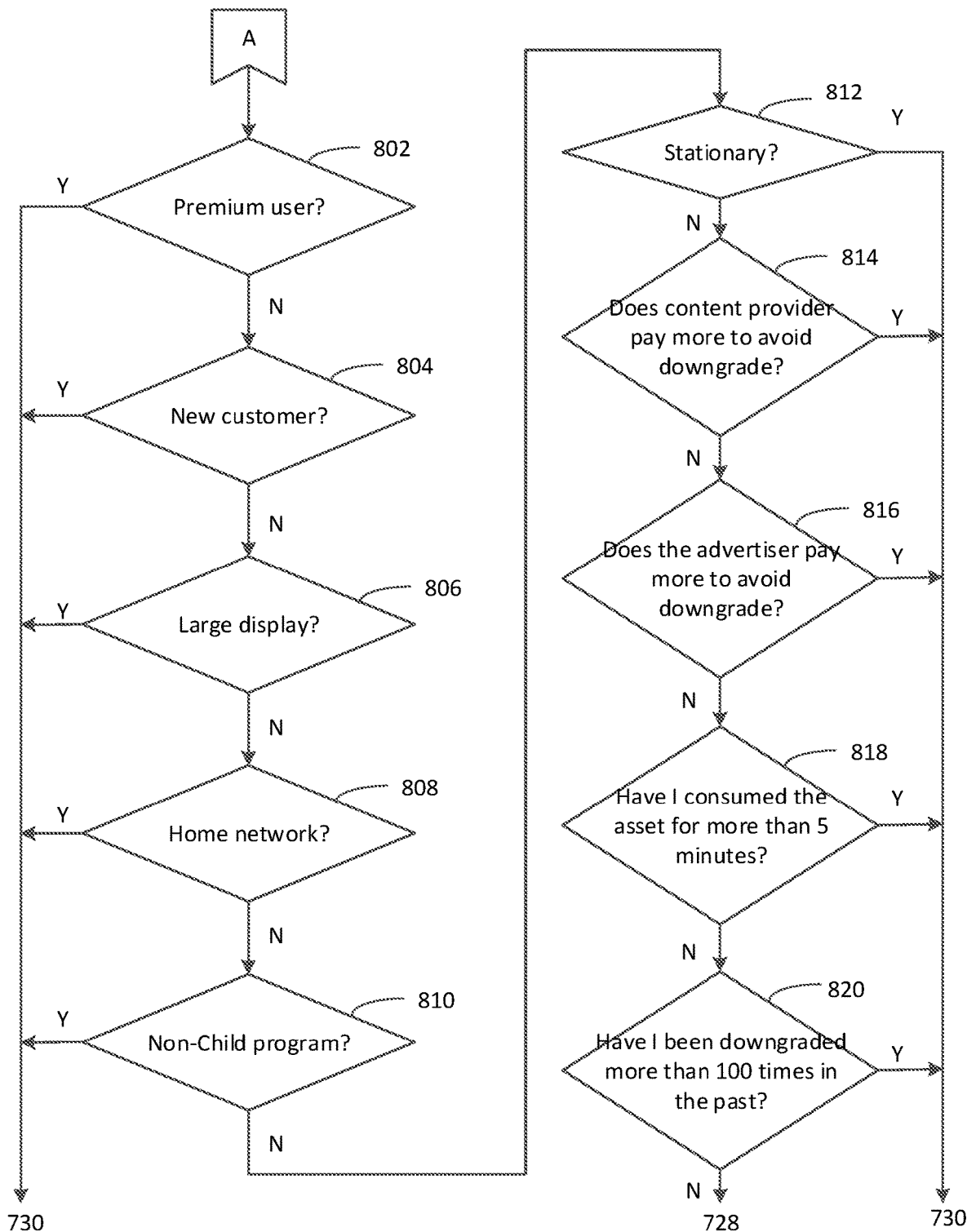
Figure 9:
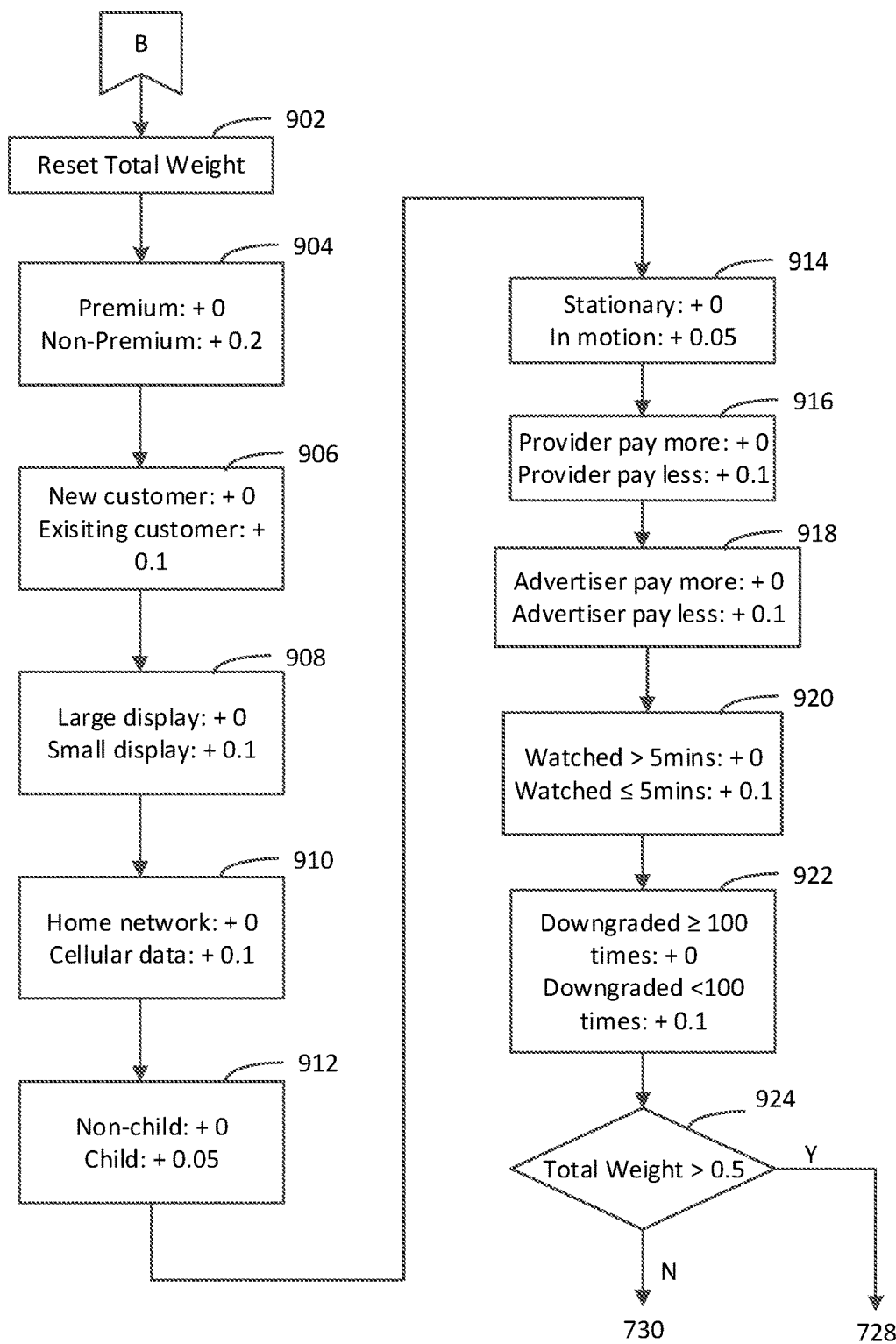

FIGS. 7-9 show an example method for an operation of a user device and a content delivery system. The process may begin at step 702 in which a user device (e.g., any one of the user devices 322-338) is initialized. At step 702, the user device may be powered on, connect to the system, provide necessary login credentials to access content, retrieve content listings, and/or any other preparations for handling a content request. The user device may update and store the user profile in a local or remote storage. The user profile may include one or more of: resolution of the associated display; size of the associated display; the associated service level (e.g., a high service level that a user pays more for, a low service level that a user pays less for, etc.); whether the user is a new customer; whether the user device is on a home network or a cellular network; whether the video program is a children's program; whether the user device is stationary; whether the content provider providing the video program pays more to avoid downgrade; if the user device is consuming an advertisement, whether the advertiser pays more to avoid downgrade; whether the user device has consumed the video program for more than a time threshold (e.g., 5 minutes); whether the user device has been downgraded for more than a certain number of times (e.g., 100 times); video format(s) that the user device is capable to process and display; identification of the user device (e.g., IP address, MAC address, etc.); or any other information associated with the user device. The user device may send the user profile to the QoS controller 304 and/or any other network components (e.g., an origin server, a cache, a network router, or etc.) in the system. The user profile may be used to determine whether the user device may avoid a service downgrade (which will be described below).

At step 704, a user may request to view a particular video program or video service (e.g., by selecting a content item from a program listing), and the user device (e.g., any one of the user devices 322-338) may send a content request for the video program or video service. For example, the user device may select an on-demand movie (e.g., "Star Wars"), or the user device may tune to a video service (e.g., HBO). This request may comprise a request for a manifest file, which may contain additional details regarding the requested content item. For example, a movie may be stored as hundreds of audiovisual files, each containing a segment (e.g. 2 seconds of playback time) of the audio and video of the movie, and the manifest file may indicate storage locations for those files (e.g., URLs for each file, file name, etc.). Several versions of the movie may be available (e.g., encoded at different quality levels discussed above), and the manifest file may indicate different locations for the different versions of the movie segments. The content request may also include the user profile.

In response to the content request, the system may send, and the user device may receive, a manifest file of the requested content. For example, after an edge cache connected to the user device receives the content request, the edge cache may determine if the edge cache has a manifest file of the requested content. If the edge cache has the manifest file, the edge cache may send the manifest file to the user device. Otherwise, the edge cache may send a request to an upper level in the hierarchy for the manifest file. After the manifest file is located, the hierarchy may pass the manifest file to the user device via the edge cache. The edge cache may store the manifest file in a local or remote storage. At step 706, the user device may receive the manifest file of the requested content. The user device may store the manifest file in a local or remote storage.

At step 708, the user device may consult the manifest file and determine which segment, and which quality version (e.g., 1080p), the user device needs (maybe the first 2 seconds of a movie). The user device may send the content request to the corresponding address listed in the manifest file. That address may point to a particular edge cache that is part of the hierarchy of caches providing that movie/content item. The edge cache can make further requests upstream as needed. After the quality version of the next content segment is located, the hierarchy may pass the quality version of content segment to the user device via the edge cache. The edge cache may store the quality version of content segment. The quality version of content segment may be included in one or more content packets that the edge cache will send to the user device in response to the content request. At step 710, the user device may receive content packets including the requested content segment.

As previously discussed, if an overload is detected in the system, the overloaded system may insert one or more QoS downgrade headers in a content packet, to inform the user device of the overload situation and to give the user device an opportunity to determine whether the user device should lower the quality of its future requests. After receiving the content packet, the user device may output the content included in the payload for display (step 712), and may begin preparations for requesting the next segment in the content item. The user device may request content segments earlier than is absolutely necessary, and may buffer them for playback. For example, at the beginning of the movie, the user device may send requests for multiple segments (e.g., segments for the first 10 seconds of the movie), and as playback progresses, the user device may issue a request for subsequent 2-second segments as they are needed.

The user device may determine if the content packet included one or more downgrade headers. At step 714, the user device may determine if the content packet included a switch-server message (e.g., X-QoS-Switch). If the content packet (e.g., the content packet 508) included a switch-server message, the process may proceed to step 716, in which the user device may sign on to a different edge cache for future requests.

At step 716, the user device may disconnect from the current edge cache, determine the address of the new content server from one or more of the other headers (or from other information such as the manifest file), and connect to the new content server based on the address. The user device may store, in a local or remote storage, an identifier of the video program (or the video service) that the user device was consuming before switching to the new content serve, an identifier of the last segment (e.g., a sequential number identifying where the last rendered segment is in the video program), or any other information associated with the content that the user device was consuming before switching to the new content server. The user device may send the new content server a request. The request may include the identifier of the video program (or the video service) that the user device was consuming before switching to the new content server. The new content server may send, and the user device may receive a manifest file of the video program (or the video service). Based on the manifest file, the user device may determine a sequential number of a next segment, in the requested content, that is subsequent to the last rendered segment. In some examples, the new server may determine a scene boundary, in the requested content, that is closest to the last rendered segment. As such, the user device may switch to the new content server seamlessly.

The process may then return to step 708 at which the user device may request the next segment (or a segment of the last scene before the determined scene boundary) of content from the new server.

If, in step 714, the content packet did not include a switch-server message, the process may proceed to step 718. At step 718, the user device may determine if the content packet includes a force downgrade message (e.g., X-QoS-Force).

If the content packet (e.g., the content packet 506) included a force downgrade message, the process proceeds to step 720. At step 720, the user device may downgrade future requests by the percentage (e.g., 50%), indicated by X-QoS-Downgrade-Degree, of the prior requested quality level. To further reduce the overall content traffic at the edge cache, the user devices that receive downgrade messages may reduce the frequency of retries for unanswered content requests. For example, before the user device receives a downgrade message, the user device may have set a retry timer for 6 seconds such that if the user device does not receive the requested content within 6 seconds, the user device may send out another request for the same content. After receiving a downgraded message, the user device may be informed of the overload and may adjust the retry timer for a longer time period (e.g., 12 seconds). Thus, the frequency of retries may be reduced.

The process may then return to step 708, in which the user device may request the next segment of the content item, and it may request a downgraded version in accordance with the downgrade. For example, the user device may downgrade by switching from 1080p resolution for the beginning of a movie, to a lower 320i resolution for a middle portion of the movie after an overload situation arises.

If the content packet does not include a force downgrade message, the process may proceed to step 722. At step 722, the user device may determine whether the content packet included conditional downgrade messages (e.g., X-QoS-Downgrade and X-QoS-Downgrade-Degree). If the content packet included the conditional downgrade messages, the process may proceed to step 724 at which the user device may make an initial determination if it can avoid the requested downgrade. For example, the user device may generate, e.g., by a random number generator, a random number between 0-100. In the example where X-QoS-Downgrade indicates 25%, if the random number falls out of the range of 0-25, the user device may determine to be excluded from the 25% downgrade subset and the process may proceed to step 730 to determine local connections (described below). If the random number falls within the range of 0-25, the process may proceed to step 726 (which will be described below in connection to FIGS. 8 and 9) to make further determination(s) if the user device can be excluded from the downgrade subset.

If it is determined that the user device cannot avoid the downgrade, and is therefore part of the downgraded subset of user devices, the process proceeds to step 728, and the downgrade will be applied to the next content segment request to be sent by the user device. Step 728 may be similar to step 720 discussed above. For example, the user device may downgrade by switching from the current bitrate version to a lower bitrate version that is indicated by X-QoS-Downgrade-Degree. The user devices may reduce retries for unanswered content requests to help reduce the overall content traffic at the edge cache.

While a user device may be subjected to a forced or conditional downgrade based on the downgrade messages from the edge cache, as discussed above, a user device may also decide to downgrade itself even without such a downgrade message. For example, if the user device's data connection speed is bad, and delivery of a requested content item does not arrive with an acceptable threshold time of sending the request, the user device may decide on its own to request a lower quality version in the future. If it is determined that the user device may avoid the downgrade indicated in the downgrade message, or if there was no downgrade message in the last segment, the process may proceed to step 730, to determine whether there were any problems with the currently-requested quality level. At step 730, the user device may determine whether the user device receives the quality version of content that the last content request asked for. If the user device determines that there is an issue with the previous request, the process may proceed to step 732. At step 732, the user device may determine that the issue may be with a local connection (e.g., private wifi) that the user device is connected to, and the user device may downgrade to a lower quality version that the currently impaired local connection allows. For example, the bandwidth of the private wifi may be only able to provide 1080p quality of service for 10 user devices. But there may be 20 user devices connected to the private wifi, so the private wifi may only provide 540i for each of the 20 user devices. The user device may downgrade by requesting for the 540i version of future content.

If the user device received the quality version of content that the last content request asked for, the user device may determine that there is no issue with the previous request, and the process may proceed to step 734. At step 734, the user device may determine that no downgrade is needed. The process may proceed to step 736. At step 736, the user device may determine whether a service change request is received. If a service change request is received, the process may return to step 704 at which the user device may request content of the new service. If no service change request is received, the process may proceed to step 738 at which the user device may determine if a power-off request is received. If a power-off request is received, the process may proceed to step 740 where the process ends. If no power-off request is received, the process may return to step 708 at which the user device may continue to request the highest bitrate version of content.

As mentioned above, if the user device does not avoid downgrade at step 724, the process may proceed to step 726 at which the user device may make further determinations if the user device is a part of the downgrade subset or if the user device may avoid the downgrade. Different methods may be used in step 726. "A" shown in step 726 indicates an example method shown in FIG. 8, and "B" shown in step 726 indicates an alternative example method shown in FIG. 9.

FIG. 8 shows an example of step 726 at which the user device determines to be included in or excluded from the downgrade subset in a binary manner. As shown in FIG. 8, the user device may go through one or more of items included in the user profile and determine if any of the items meets a criterion. If a criterion is met, the user device may determine that it will downgrade its future requests; otherwise, the user device may determine that it can avoid the downgrade.

At step 802, the user device may determine if the user device is associated with a premium user (e.g., the premium user pays more for a higher service level). If the user device is associated with a premium user, the user device may determine to avoid the downgrade, and the process may proceed to step 730. If the user device is not associated with a premium user, the user device may continue to determine if another item included in the user profile meets a criterion for avoiding the downgrade.

At step 804, if the user device is a new customer (e.g., a user device that was newly registered with the system within a predetermined time period), the user device may determine to avoid the downgrade and the process may proceed to step 730. This may help the system keep new customers. If the user device is not a new customer, the user device may continue to determine if another item included in the user profile meets a criterion.

At step 806, if the user device is a large display or has a high resolution (e.g., a 4k display), the user device may determine to avoid the downgrade and the process may proceed to step 730. This may be helpful because customers with larger displays are more likely to notice bad effects of a downgrade in video quality. If the user device is a small display or has a low resolution, the user device may continue to determine if another item included in the user profile meets a criterion. Similar treatment may be made for audio devices-user devices that are associated with more sophisticated audio setups (e.g., more speakers, larger speakers, etc.) as compared to threshold audio levels may choose to avoid audio downgrades.

At step 808, if the user device is connected to a home network (e.g., on an Internet provided by a cable service company), the user device may determine to avoid the downgrade and the process may proceed to step 730. The system may provide this binary option to encourage users to use their own home network. Also, users who are traveling may be more willing to lower their quality demands. If the user device is connected to a non-home network (e.g., on a cellular network or a public wifi), the user device may continue to determine if another item included in the user profile meets a criterion.

At step 810, if the user device is not consuming a children's program, the user device may determine to avoid the downgrade and the process may proceed to step 730. The system may provide this binary option because children may be less likely to complain if their video quality drops. If the user device is consuming a children's program, the user device may continue to determine if another item included in the user profile meets a criterion.

At step 812, if the user device is stationary, the user device may determine to avoid the downgrade and the process may proceed to step 730. The system may provide this binary option because a user may more likely notice the quality drop on a stationary display. If the user device is not stationary (e.g., the user device is located in a vehicle that is bumping along a rough road), the user device may continue to determine if another item included in the user profile meets a criterion.

At step 814, if the content provider, which provides the video program or video service that is being consumed by the user device, is associated with a high service level (e.g., the content provider pays more to avoid downgrade), the user device may determine to avoid the downgrade and the process may proceed to step 730. If the content provider is associated with a low service level, the user device may continue to determine if another item included in the user profile meets a criterion.

At step 816, if the user device is consuming an advertisement, the user device may determine if the advertiser is associated with a high service level (e.g., the advertiser pays more to avoid downgrade). If the advertiser pays more for avoiding downgrade, the user device may determine to avoid the downgrade and the process may proceed to step 730. Otherwise, the user device may continue to determine if another item included in the user profile meets a criterion.

At step 818, if the user device has consumed a same video program for more than a certain time period (e.g., 5 minutes), the user device may determine to avoid the downgrade and the process may proceed to step 730. The system may provide this binary option to ensure a user, who has watched the video program for more than a certain time period and is more invested in the video program, to continue watching the program with good video quality. If the user device has consumed a same video program for less than the certain time period, the user device may continue to determine if another item included in the user profile meets a criterion.

At step 820, if the user device has been downgraded for more than a certain number of times (e.g., 100 times), the user device may determine to avoid the downgrade and the process may proceed to step 730. If a same user is downgraded too many times in the past, the user may complain. So, the system may provide this binary option to prevent a user from being downgraded too many times. If the user device has been downgraded less than the certain number of times, the process may proceed to step 728 at which the user device may downgrade by switching from the current bitrate version to a lower bitrate version that is indicated by X-QoS-Downgrade-Degree. In some cases, if a user is downgraded too many times within a short time period, the user may more likely complain. So, the system may prevent a user from being downgraded too many times within a certain time period. the user device may track the downgrade times within a recent time period. For example, the user device may track that the user device has been downgraded more than 100 times within the past 3 months, and may avoid the downgrade.

FIG. 9 shows an alternative example of step 726 at which the user device determines to downgrade or avoid the downgrade based on weights assigned to corresponding items included in the user profile. The user device may assign weights to corresponding items included in the user profile, and determine whether to increase a total weight based on whether the items included in the user profile meet corresponding criteria. If a criterion more likely affects user's reviewing experience and/or affects overall service, a higher weight may be assigned to the corresponding item, and vice versa.

At step 902, the user device may reset a total weight. For example, the user device may set the total weight to 0.

The service level associated with the user device may be assigned by a weight of 0.2. At step 904, if the service level associated with the user device is a high service level, the total weight does not change. Otherwise, a total weight may be increased by 0.2. The weight assigned to the server level associated with the user device may vary (e.g., be increased or decreased). For example, if it is highly important to guarantee high resolution services to the users who pay more, a higher weight (e.g., 0.3) may be to the service level.

A resolution or size of the associated display may be assigned by a weight of 0.1. At step 906, if the display is a high resolution or has a large size, the total weight does not change. Otherwise, a total weight may be increased by 0.1. The weight assigned to the resolution or size of the associated display may vary. For example, if the system cares about high resolution/large displays more than lower resolution/small displays, a higher weight (e.g., 0.2) may be assigned to the resolution or size of the associated display.

Whether the user device is a new customer may be assigned by a weight of 0.1. At step 908, if the user device is a new customer, the total weight does not change. Otherwise, a total weight may be increased by 0.1. The weight assigned to whether the user device is a new customer may vary. For example, if it is highly important to keep new customers, a higher weight (e.g., 0.2) may be assigned to whether the user device is a new customer.

Whether the user device is connected to a home network may be assigned by a weight of 0.1. At step 910, if the user device is connected to a home network, the total weight does not change. Otherwise, a total weight may be increased by 0.1. The weight assigned to whether the user device is connected to a home network may vary. For example, if it is highly important to encourage users to use their own home network, a higher weight (e.g., 0.2) may be assigned to whether the user device is connected to a home network.

Whether the content that the user device is consuming is a children's program may be assigned by a weight of 0.05. At step 912, the user device is not consuming a children's program, the total weight does not change. Otherwise, a total weight may be increased by 0.05. The weight assigned to whether the content that the user device is consuming is a children's program may vary. For example, if the system determines that children's feedbacks are highly important, a lower weight (e.g., 0.01) may be assigned to whether the content that the user device is consuming is a children's program.

Whether the user device is stationary may be assigned by a weight of 0.05. At step 914, if the user device is stationary, the total weight does not change. Otherwise, a total weight may be increased by 0.05. The weight assigned to whether the user device is stationary may vary. For example, if it is determined that the viewing experience of passengers in vehicles are highly important, the system may assign a lower weight (e.g., 0.01) to whether the user device is stationary.

The service level of the content provider may be assigned by a weight of 0.1. At step 916, if the service level of the content provider is a high service level, the total weight does not change. Otherwise, a total weight may be increased by 0.1. The weight assigned to the service level of the content provider may vary. For example, if it is highly important to encourage content providers to pay more to avoid the downgrade, a higher weight (e.g., 0.2) may be assigned to the service level of the content provider.

If the user device is consuming an advertisement, the service level of the advertiser may be assigned by a weight of 0.1. At step 918, if the service level of the advertiser is a high service level, the total weight does not change. Otherwise, a total weight may be increased by 0.1. The weight assigned to the service level of the advertiser may vary. For example, if it is highly important to encourage advertisers to pay more to avoid the downgrade, a higher weight (e.g., 0.2) may be assigned to service level of the advertiser.

Whether the user device has consumed a same video program for more than a time threshold (e.g., 5 minutes) may be assigned by a weight of 0.1. At step 920, if the user device has consumed a same video program for more than 5 minutes, the total weight does not change. Otherwise, a total weight may be increased by 0.1. The weight assigned to whether the user device has consumed a same video program for more than a time threshold may vary. For example, if it is highly important to ensure a user, who has watched the video program for more than a certain time period, to continue watching the program with good video quality, a higher weight (e.g., 0.2) may be assigned to whether the user device has consumed a same video program for more than a time threshold.

Whether the user device has been downgraded for more than a certain number of times (or a certain number of times during a certain time period) may be assigned by a weight of 0.1. At step 922, if the user device has been downgraded for more than 100 time in the past 3 months, the total weight does not change. Otherwise, a total weight may be increased by 0.1. The weight assigned to whether the user device has been downgraded for more than a certain number of times (or a certain number of times during a certain time period) may vary. For example, if it is determined that users unlikely cancel the service provided by the system even if they have been downgraded more than 100 times within 3 months, a higher weight (e.g., 0.2) may be assigned to whether the user device has been downgraded for more than 100 times in 3 months.

At step 924, the user device may determine if the total weight is greater than a threshold (e.g., 0.5). If the total weight is greater than the threshold, the process may proceed to step 728 at which the user device may downgrade. If the total weight is not greater than the threshold, the process may proceed to step 730.

The assigned weights may be any values that are not limited to the values described above. Additional items included in the user profile may be assigned by corresponding weights. One or more items described does not need to be assigned weights if it is determined the one or more items do not attribute to the determination of whether to downgrade or not.

The method of FIG. 8 and the method of FIG. 9 may be combined. The system may determine some items in the user profile may play dominant roles in the downgrade determinations, while other items may assist the determination. The user device may make downgrade determinations based on the dominate items in a binary manner (FIG. 8) and/or based on weights assigned to other non-dominant items (FIG. 9). For example, the user device may determine whether an item of a subset of items included in the user profile meets a criterion. If any item in the subset meets a corresponding criterion, the user device may determine to avoid the downgrade. If none of the items in the subset meet the corresponding criteria, the user device may make determinations based on weights assigned to other items in the user profile. For example, similar to the method of FIG. 8, if the user device is associated with a premium user, the user device may determine to avoid the downgrade, and the process may proceed to step 730. If the content provider is associated with a high service level, the user device may determine to avoid the downgrade and the process may proceed to step 730. If the advertiser is associated with a high service level, the user device may determine to avoid the downgrade and the process may proceed to step 730. If none of the above three items meet corresponding criteria, similar to the method of FIG. 9, the user device may determine if a total weight based on other items included in the user profile exceeds a threshold. If the total weight is greater than the threshold, the process may proceed to step 728 at which the user device may downgrade.

The order of the steps in FIGS. 7-9 may vary. In FIG. 7, one or more steps of 714, 718, or 722 may be omitted, and/or one or more additional escalating downgrade steps may be added. In FIG. 8, one or more of steps 802-820 may be omitted, and/or one or more additional determination steps based on one or more additional items included in the user profile may be added, and/or the order of steps 802-820 may be changed into any order. In FIG. 9, one or more of steps 904-926 may be omitted, and/or one or more additional steps to determine the total weight based on one or more additional items included in the user profile may be added, and/or the order of steps 904-924 may be changed into any order.

The QoS controller or the network components may perform one or more steps in FIGS. 8-9. In these cases, the QoS controller or the network components may play a role in determining if the user device needs to be downgraded.

In a system described above, overloads at the network components may be promptly resolved and the possibility of a system outage may be reduced.

Although examples are described above, features and/or steps of those examples may be combined, divided, omitted, rearranged, revised, and/or augmented in any desired manner. Various alterations, modifications, and improvements will readily occur to those skilled in the art. Such alterations, modifications, and improvements are intended to be part of this description, though not expressly stated herein, and are intended to be within the spirit and scope of the disclosure. Accordingly, the foregoing description is by way of example only, and is not limiting.

The invention claimed is:

1. A method comprising:
    determining, by a computing device, a first overload condition at a network component that sends content based on content requests received from a plurality of user devices;
    determining, based on the first overload condition, a quantity of user devices, among the plurality of user devices, to be downgraded; and
    sending, based on the quantity of the user devices to be downgraded, a downgrade message to the plurality of user devices, wherein the downgrade message comprises:
        a request to downgrade future requests for content, and
        information to allow the plurality of user devices to individually determine whether to avoid the requested downgrade, wherein the information indicates the quantity of user devices to be downgraded.

2. The method of claim 1, wherein the downgrade message is added in a content packet previously requested by the plurality of user devices.

3. The method of claim 1, wherein the downgrade message is added in a video packet previously requested by the plurality of user devices.

4. The method of claim 1, further comprising sending a plurality of different downgrade messages, each indicating a different percentage of user devices and a different degree of downgrade.

5. The method of claim 1, wherein the information indicates a percentage, of the plurality of user devices, to be downgraded.

6. The method of claim 1, wherein the request to downgrade indicates a degree of quality reduction associated with the requested downgrade.

7. The method of claim 1, further comprising:
    sending a second downgrade message to a second plurality of user devices, wherein the second downgrade message comprises:
        information indicating a quantity of user devices, among the second plurality of user devices, to be downgraded,
        a degree of quality reduction associated with the requested downgrade, and
        an indication to force one or more of the second plurality of user devices to downgrade future requests for content.

8. The method of claim 1, further comprising:
    determining a second overload condition at a second network component that sends content based on content requests received from a second plurality of user devices;
    determining, based on popularity, one or more content services that are being consumed by the second plurality of user devices; and
    causing user devices, of the second plurality of user devices, to downgrade future requests for content from the one or more content services.

9. The method of claim 1, further comprising:
    storing information indicating a plurality of levels of the first overload condition, wherein each level of the plurality of levels is associated with a corresponding downgrade subset of the plurality of user devices and a corresponding downgrade degree.

10. A non-transitory computer-readable medium storing instructions that, when executed, cause:
    determining a first overload condition at a network component that sends content based on content requests received from a plurality of user devices;
    determining, based on the first overload condition, a quantity of user devices, among the plurality of user devices, to be downgraded; and
    sending, based on the quantity of the user devices to be downgraded, a downgrade message to the plurality of user devices, wherein the downgrade message comprises:
        a request to downgrade future requests for content, and
        information to allow the plurality of user devices to individually determine whether to avoid the requested downgrade, wherein the information indicates the quantity of user devices to be downgraded.

11. The non-transitory computer-readable medium of claim 10, wherein the downgrade message is added in a content packet previously requested by the plurality of user devices.

12. The non-transitory computer-readable medium of claim 10, wherein the downgrade message is added in a video packet previously requested by the plurality of user devices.

13. The non-transitory computer-readable medium of claim 10, wherein the instructions, when executed, cause:
    sending a plurality of different downgrade messages, each indicating a different percentage of user devices and a different degree of downgrade.

14. The non-transitory computer-readable medium of claim 10, wherein the information indicates a percentage, of the plurality of user devices, to be downgraded.

15. The non-transitory computer-readable medium of claim 10, wherein the request to downgrade indicates a degree of quality reduction associated with the requested downgrade.

16. The non-transitory computer-readable medium of claim 10, wherein the instructions, when executed, cause:
    sending a second downgrade message to a second plurality of user devices, wherein the second downgrade message comprises:
        information indicating a quantity of user devices, among the second plurality of user devices, to be downgraded,
        a degree of quality reduction associated with the requested downgrade, and an indication to force one or more of the second plurality of user devices to downgrade future requests for content.

17. The non-transitory computer-readable medium of claim 10, wherein the instructions, when executed, cause:
   determining a second overload condition at a second network component that sends content based on content requests received from a second plurality of user devices;
   determining, based on popularity, one or more content services that are being consumed by the second plurality of user devices; and
   causing user devices, of the second plurality of user devices, to downgrade future requests for content from the one or more content services.

18. The non-transitory computer-readable medium of claim 10, wherein the instructions, when executed, cause:
   storing information indicating a plurality of levels of the first overload condition, wherein each level of the plurality of levels is associated with a corresponding downgrade subset of the plurality of user devices and a corresponding downgrade degree.

19. The method of claim 1, wherein the downgrade of future requests for content comprises receiving a lower resolution of content.

20. The non-transitory computer-readable medium of claim 10, wherein the downgrade of future requests for content comprises receiving a lower resolution of content.

21. An apparatus comprising:
   one or more processors; and
   memory storing instructions that, when executed by the one or more processors, cause the apparatus to:
      determine a first overload condition at a network component that sends content based on content requests received from a plurality of user devices;
      determine, based on the first overload condition, a quantity of user devices, among the plurality of user devices, to be downgraded; and
      send, based on the quantity of the user devices to be downgraded, a downgrade message to the plurality of user devices, wherein the downgrade message comprises:
         a request to downgrade future requests for content, and
         information to allow the plurality of user devices to individually determine whether to avoid the requested downgrade, wherein the information indicates the quantity of user devices to be downgraded.

22. The apparatus of claim 21, wherein the downgrade message is added in a content packet previously requested by the plurality of user devices.

23. The apparatus of claim 21, wherein the downgrade message is added in a video packet previously requested by the plurality of user devices.

24. The apparatus of claim 21, wherein the memory further stores instructions that, when executed by the one or more processors, cause the apparatus to:
   send a plurality of different downgrade messages, each indicating a different percentage of user devices and a different degree of downgrade.

25. The apparatus of claim 21, wherein the information indicates a percentage, of the plurality of user devices, to be downgraded.

26. The apparatus of claim 21, wherein the request to downgrade indicates a degree of quality reduction associated with the requested downgrade.

27. The apparatus of claim 21, wherein the memory further stores instructions that, when executed by the one or more processors, cause the apparatus to:
   send a second downgrade message to a second plurality of user devices, wherein the second downgrade message comprises:
      information indicating a quantity of user devices, among the second plurality of user devices, to be downgraded,
      a degree of quality reduction associated with the requested downgrade, and
      an indication to force one or more of the second plurality of user devices to downgrade future requests for content.

28. The apparatus of claim 21, wherein the memory further stores instructions that, when executed by the one or more processors, cause the apparatus to:
   determine a second overload condition at a second network component that sends content based on content requests received from a second plurality of user devices;
   determine, based on popularity, one or more content services that are being consumed by the second plurality of user devices; and
   cause user devices, of the second plurality of user devices, to downgrade future requests for content from the one or more content services.

29. The apparatus of claim 21, wherein the memory further stores instructions that, when executed by the one or more processors, cause the apparatus to:
   store information indicating a plurality of levels of the first overload condition, wherein each level of the plurality of levels is associated with a corresponding downgrade subset of the plurality of user devices and a corresponding downgrade degree.

30. The apparatus of claim 21, wherein the downgrade of future requests for content comprises receiving a lower resolution of content.

31. A system comprising:
   an apparatus; and
   a first user device;
   wherein the apparatus comprises:
      one or more processors; and
      memory storing instructions that, when executed by the one or more processors, cause the apparatus to:
         determine a first overload condition at a network component that sends content based on content requests received from a plurality of user devices that includes the first user device;
         determine, based on the first overload condition, a quantity of user devices, among the plurality of user devices, to be downgraded; and
         send, based on the quantity of the user devices to be downgraded, a downgrade message to the plurality of user devices, wherein the downgrade message comprises:
            a request to downgrade future requests for content, and
            information to allow the plurality of user devices to individually determine whether to avoid the requested downgrade, wherein the information indicates the quantity of user devices to be downgraded; and wherein the first user device comprises:
  one or more second processors; and
  second memory storing second instructions that, when executed by the one or more second processors, cause the first user device to:
    receive the downgrade message.

32. The system of claim 31, wherein the downgrade message is added in a content packet previously requested by the plurality of user devices.

33. The system of claim 31, wherein the downgrade message is added in a video packet previously requested by the plurality of user devices.

34. The system of claim 31, wherein the memory of the apparatus further stores instructions that, when executed by the one or more processors of the apparatus, further cause the apparatus to:
  send a plurality of different downgrade messages, each indicating a different percentage of user devices and a different degree of downgrade.

35. The system of claim 31, wherein the information indicates a percentage, of the plurality of user devices, to be downgraded.

36. The system of claim 31, wherein the request to downgrade indicates a degree of quality reduction associated with the requested downgrade.

37. The system of claim 31, wherein the memory of the apparatus further stores instructions that, when executed by the one or more processors of the apparatus, cause the apparatus to:
  send a second downgrade message to a second plurality of user devices, wherein the second downgrade message comprises:
    information indicating a quantity of user devices, among the second plurality of user devices, to be downgraded,
    a degree of quality reduction associated with the requested downgrade, and
    an indication to force one or more of the second plurality of user devices to downgrade future requests for content.

38. The system of claim 31, wherein the memory of the apparatus further stores instructions that, when executed by the one or more processors of the apparatus, cause the apparatus to:
  determine a second overload condition at a second network component that sends content based on content requests received from a second plurality of user devices;
  determine, based on popularity, one or more content services that are being consumed by the second plurality of user devices; and
  cause user devices, of the second plurality of user devices, to downgrade future requests for content from the one or more content services.

39. The system of claim 31, wherein the memory of the apparatus further stores instructions that, when executed by the one or more processors of the apparatus, cause the apparatus to:
  store information indicating a plurality of levels of the first overload condition, wherein each level of the plurality of levels is associated with a corresponding downgrade subset of the plurality of user devices and a corresponding downgrade degree.

40. The system of claim 31, wherein the downgrade of future requests for content comprises receiving a lower resolution of content.

* * * * *